(12) United States Patent
Shoemaker et al.

(10) Patent No.: US 9,218,635 B2
(45) Date of Patent: Dec. 22, 2015

(54) SYSTEMS AND METHODS FOR OPTIMIZING SHIPPING PRACTICES

(75) Inventors: Larry Shoemaker, Cornelius, NC (US); Mark Beaver, Lexington, SC (US)

(73) Assignee: United Parcel Service of America, Inc., Atlanta, GA (US)

( * ) Notice: Subject to any disclaimer, the term of this patent is extended or adjusted under 35 U.S.C. 154(b) by 1366 days.

(21) Appl. No.: 12/428,279

(22) Filed: Apr. 22, 2009

(65) Prior Publication Data

US 2010/0274609 A1    Oct. 28, 2010

(51) Int. Cl.
G06Q 30/00 (2012.01)
G06Q 50/28 (2012.01)
G06Q 10/08 (2012.01)
G06Q 10/00 (2012.01)

(52) U.S. Cl.
CPC ............ *G06Q 50/28* (2013.01); *G06Q 10/08* (2013.01); *G06Q 10/0833* (2013.01); *G06Q 10/08355* (2013.01)

(58) Field of Classification Search
CPC .. G06Q 10/0838; G06Q 10/08; G06Q 10/083
USPC ........................... 705/1.1, 330–341, 400–411
See application file for complete search history.

(56) References Cited

U.S. PATENT DOCUMENTS

| | | | |
|---|---|---|---|
| 6,934,594 B2* | 8/2005 | Loring et al. ................. | 700/100 |
| 2002/0019759 A1* | 2/2002 | Arunapuram et al. ............ | 705/7 |
| 2004/0073448 A1 | 4/2004 | Barts et al. | |
| 2004/0249699 A1* | 12/2004 | Laurent et al. .................. | 705/10 |
| 2005/0015167 A1* | 1/2005 | Searcy et al. ................. | 700/100 |
| 2006/0167733 A1* | 7/2006 | Scott et al. ........................ | 705/8 |
| 2007/0276685 A1 | 11/2007 | Raupers et al. | |
| 2008/0077464 A1* | 3/2008 | Gottlieb et al. ................... | 705/8 |

OTHER PUBLICATIONS

Tarek T. Taha, et al. "A simulation-based software system for evaluating hub-and-spoke transportation networks", Simulation practice and theory, vol. 3, 1996, p. 327-346.*

* cited by examiner

*Primary Examiner* — George Chen
(74) *Attorney, Agent, or Firm* — Alston & Bird LLP

(57) ABSTRACT

According to various embodiments, a load planning system is provided for simulating shipments based on a shipping entity's planned routing of packages and a shipper's (e.g., shipping entity customer) historical shipping volume. By using the load planning system to simulate shipments according to a variety of package routing plans, a user of the load planning system may identify shipping routes along which certain shipments may by-pass the sorting process of regional shipping hubs. These by-passing routes allow the shipping entity to provide the shipper with more efficient and less costly shipping options according to various embodiments.

23 Claims, 19 Drawing Sheets

Exemplary Historical Shipment Data

| Origin Country | Origin Zip | Origin State | Destination Country | Destination Zip | Destination State | Number of Packages | Weight | Service Level |
|---|---|---|---|---|---|---|---|---|
| UNITED_STATES | 27587 | NC | UNITED_STATES | 93551 | CA | 24 | 446 | GND |
| UNITED_STATES | 27587 | NC | UNITED_STATES | 93551 | CA | 29 | 547 | GND |
| UNITED_STATES | 27587 | NC | UNITED_STATES | 93551 | CA | 27 | 501 | GND |
| UNITED_STATES | 27587 | NC | UNITED_STATES | 93551 | CA | 47 | 886 | GND |
| UNITED_STATES | 27587 | NC | UNITED_STATES | 93551 | CA | 10 | 190 | GND |
| UNITED_STATES | 27587 | NC | UNITED_STATES | 93551 | CA | 9 | 170 | GND |
| UNITED_STATES | 27587 | NC | UNITED_STATES | 95815 | CA | 41 | 776 | GND |
| UNITED_STATES | 27587 | NC | UNITED_STATES | 95815 | CA | 31 | 582 | GND |
| UNITED_STATES | 27587 | NC | UNITED_STATES | 95815 | CA | 27 | 512 | GND |
| UNITED_STATES | 27587 | NC | UNITED_STATES | 95815 | CA | 78 | 1464 | GND |
| UNITED_STATES | 27587 | NC | UNITED_STATES | 95815 | CA | 16 | 287 | GND |
| UNITED_STATES | 27587 | NC | UNITED_STATES | 95815 | CA | 13 | 240 | GND |
| UNITED_STATES | 27587 | NC | UNITED_STATES | 85308 | AZ | 26 | 494 | GND |
| UNITED_STATES | 27587 | NC | UNITED_STATES | 85308 | AZ | 33 | 620 | GND |
| UNITED_STATES | 27587 | NC | UNITED_STATES | 85308 | AZ | 37 | 697 | GND |
| UNITED_STATES | 27587 | NC | UNITED_STATES | 85308 | AZ | 15 | 274 | GND |
| UNITED_STATES | 27587 | NC | UNITED_STATES | 85308 | AZ | 9 | 157 | GND |
| UNITED_STATES | 27587 | NC | UNITED_STATES | 93304 | CA | 18 | 340 | GND |
| UNITED_STATES | 27587 | NC | UNITED_STATES | 93304 | CA | 23 | 428 | GND |
| UNITED_STATES | 27587 | NC | UNITED_STATES | 93304 | CA | 28 | 525 | GND |
| UNITED_STATES | 27587 | NC | UNITED_STATES | 93304 | CA | 47 | 875 | GND |
| UNITED_STATES | 27587 | NC | UNITED_STATES | 93304 | CA | 6 | 102 | GND |
| UNITED_STATES | 27587 | NC | UNITED_STATES | 93304 | CA | 8 | 150 | GND |
| UNITED_STATES | 27587 | NC | UNITED_STATES | 94608 | CA | 39 | 732 | GND |
| UNITED_STATES | 27587 | NC | UNITED_STATES | 94608 | CA | 48 | 904 | GND |
| UNITED_STATES | 27587 | NC | UNITED_STATES | 94608 | CA | 33 | 609 | GND |
| UNITED_STATES | 27587 | NC | UNITED_STATES | 94608 | CA | 58 | 1096 | GND |
| UNITED_STATES | 27587 | NC | UNITED_STATES | 94608 | CA | 23 | 437 | GND |
| UNITED_STATES | 27587 | NC | UNITED_STATES | 94608 | CA | 9 | 168 | GND |
| UNITED_STATES | 27587 | NC | UNITED_STATES | 90048 | CA | 22 | 406 | GND |
| UNITED_STATES | 27587 | NC | UNITED_STATES | 90048 | CA | 26 | 476 | GND |
| UNITED_STATES | 27587 | NC | UNITED_STATES | 90048 | CA | 30 | 560 | GND |
| UNITED_STATES | 27587 | NC | UNITED_STATES | 90048 | CA | 64 | 1206 | GND |
| UNITED_STATES | 27587 | NC | UNITED_STATES | 90048 | CA | 12 | 212 | GND |
| UNITED_STATES | 27587 | NC | UNITED_STATES | 90048 | CA | 9 | 170 | GND |
| UNITED_STATES | 27587 | NC | UNITED_STATES | 89109 | NV | 23 | 432 | GND |

FIGURE 8

EXEMPLARY PACKAGE ROUTING DATA

| Current Country | Simulation Origin Location ID | Current Sort | Destination Country | Destination Location ID Start | Destination Location ID End | Next Hub Country | Next Hub | Next Hub Sort |
|---|---|---|---|---|---|---|---|---|
| US | 7709 | T | US | 0001 | 0099 | US | NOFL> | . |
| US | 7709 | T | US | 0100 | 0699 | US | 0189 | D |
| US | 7709 | T | US | 0700 | 0899 | US | 0799 | D |
| US | 7709 | T | US | 0900 | 0996 | US | NOFL> | . |
| US | 7709 | T | US | 0997 | 1190 | US | 0799 | D |
| US | 7709 | T | US | 1191 | 1191 | US | 0189 | D |
| US | 7709 | T | US | 1192 | 1199 | US | 0799 | D |
| US | 7709 | T | US | 1200 | 1239 | US | 6059 | T |
| US | 7709 | T | US | 1240 | 1279 | US | 7519 | D |
| US | 7709 | T | US | 1280 | 1499 | US | 6059 | T |
| US | 7709 | T | US | 1500 | 1699 | US | 1569 | N |
| US | 7709 | T | US | 1700 | 1969 | US | 1909 | D |
| US | 7709 | T | US | 1970 | 2389 | US | 2079 | T |
| US | 7709 | T | US | 2390 | 2699 | US | 3719 | N |
| US | 7709 | T | US | 2700 | 2999 | US | 2749 | D |
| US | 7709 | T | US | 3000 | 3199 | US | 3039 | D |
| US | 7709 | T | US | 3200 | 3239 | US | 3229 | T |
| US | 7709 | T | US | 3240 | 3259 | US | 3609 | N |
| US | 7709 | T | US | 3260 | 3499 | US | 3229 | T |
| US | 7709 | T | US | 3500 | 3699 | US | 3609 | N |
| US | 7709 | T | US | 3700 | 3859 | US | 3719 | N |
| US | 7709 | T | US | 3860 | 3999 | US | 3929 | N |
| US | 7709 | T | US | 4000 | 4299 | US | 3719 | N |
| US | 7709 | T | US | 4300 | 4599 | US | 4369 | T |
| US | 7709 | T | US | 4600 | 4799 | US | 6059 | T |
| US | 7709 | T | US | 4800 | 4979 | US | 4369 | T |
| US | 7709 | T | US | 4980 | 4999 | US | 6059 | T |
| US | 7709 | T | US | 5000 | 5299 | US | 7319 | T |
| US | 7709 | T | US | 5300 | 5499 | US | 6059 | T |
| US | 7709 | T | US | 5500 | 5699 | US | 6629 | T |
| US | 7709 | T | US | 5700 | 5899 | US | 7319 | T |
| US | 7709 | T | US | 5900 | 5999 | US | 8029 | N |
| US | 7709 | T | US | 6000 | 6189 | US | 6059 | T |

FIGURE 9

EXEMPLARY LOAD PLANNING DATA

| Combined Location ID Code | Hub Name | Total Number of Inbound Packages | Number of Days in Period | Daily Package Volume |
|---|---|---|---|---|
| 1569N | NEW STANTON | 410 | 250 | 2 |
| 189D | CHELMSFORD | 898 | 250 | 4 |
| 1909D | WILLOW GROVE | 605 | 250 | 2 |
| 2079T | BURTONSVILLE | 1641 | 250 | 7 |
| 2749D | GREENSBORO HUB | 2003 | 250 | 8 |
| 3039D | ATLANTA | 838 | 250 | 3 |
| 3229T | JACKSONVILLE | 1895 | 250 | 8 |
| 3609N | MONTGOMERY HUB | 649 | 250 | 3 |
| 3719N | WHITES CREEK HUB | 1167 | 250 | 5 |
| 3929N | JACKSON HUB | 2482 | 250 | 10 |
| 4369T | TOLEDO HUB | 1364 | 250 | 5 |
| 6059T | CACH | 1985 | 250 | 8 |
| 6309N | EARTH CITY | 157 | 250 | 1 |
| 6629T | LENEXA | 13590 | 250 | 54 |
| 7019N | NEW ORLEANS HUB | 6227 | 250 | 25 |
| 7069N | LAKE CHARLES HUB | 7976 | 250 | 32 |
| 7229T | LITTLE ROCK | 13220 | 250 | 53 |
| 7319T | OKLAHOMA CITY | 16115 | 250 | 64 |
| 7519D | MESQUITE | 6563 | 250 | 26 |
| 7519P | MESQUITE | 12458 | 250 | 50 |
| 7529P | DALLAS | 3638 | 250 | 15 |
| 7560P | LONGVIEW | 949 | 250 | 4 |
| 7570P | TYLER | 1344 | 250 | 5 |
| 7580P | PALESTINE | 219 | 250 | 1 |
| 7590P | LUFKIN CENTER | 868 | 250 | 3 |
| 7619P | FORT WORTH | 5947 | 250 | 24 |
| 7649S | DALLAS-FT WORTH | 6898 | 250 | 28 |
| 7709P | SWEETWATER HOUSTON | 5791 | 250 | 23 |
| 7730P | CONROE | 2105 | 250 | 8 |
| 7749P | STAFFORD | 7419 | 250 | 30 |
| 7750P | TEXAS CITY | 456 | 250 | 2 |
| 7752P | BAYTOWN | 362 | 250 | 1 |
| 7753P | ANGLETON | 252 | 250 | 1 |
| 7756P | LEAGUE CITY | 1012 | 250 | 4 |

FIGURE 13

SYSTEMS AND METHODS FOR OPTIMIZING SHIPPING PRACTICES

BACKGROUND OF THE INVENTION

Typically, packages shipped by shipping carriers (e.g., United Parcel Service, Inc.; FedEx Corp.; or the United States Postal Service) are routed from their origin to their destination through a variety of shipping hubs located at various points along a planned route. Many of these hubs are regional warehouses used by shipping carriers as intermediary points where packages en route are sorted and loaded onto a shipping vehicle for transport to the next hub. As the packages inbound to each hub may be shipped by many different customers and bound for many different destinations, this sorting process is usually necessary to ensure inbound packages are correctly routed to their destination.

Although the sorting process allows shipping carriers to efficiently route the shipments of their many customers, sorting a package at every hub through which it travels has a number of drawbacks. First, each time a package is sorted at a hub, the shipment of the package is delayed by the amount of time it takes to receive, process, sort, and load the package onto the next shipping vehicle. Second, in light of the costs and resources needed to provide sorting services at each hub, customers are typically charged increasing shipping rates proportional to the number of hubs their packages flow through.

Accordingly, there is a need in the art for a system that allows shipping carriers to optimize their shipping practices by identifying shipping routes along which a customer may by-pass the sorting process of regional shipping hubs.

BRIEF SUMMARY OF VARIOUS EMBODIMENTS OF THE INVENTION

As a result, it is advantageous to both shipping carriers and customers of shipping carriers to optimize shipping routes by minimizing the number of hubs a given customer's packages flow through. One approach to accomplishing this is simulating various shipping routes for packages being shipped by a particular shipper from a particular origin location to one or more destination locations and identifying direct or more direct shipments for at least a subset of these packages based on these simulated routes. For example, a direct shipment may be identified for a particular group of packages if the shipper ships enough packages in a certain time period to fill a single shipping vehicle at a particular hub (e.g., an origin hub or a next shipping hub that is intermediate to the origin hub and a destination hub).

According to various embodiments of the present invention, a load planning system is provided for simulating shipments based on a shipping entity's planned routing of packages and a shipper's (e.g., shipping entity customer) historical shipping volume. By using the load planning system to simulate shipments according to a variety of package routing plans, a user of the load planning system may identify shipping routes along which certain shipments may by-pass the sorting process of regional shipping hubs. These by-passing routes allow the shipping entity to provide the shipper with more efficient and less costly shipping options according to various embodiments.

Various embodiments of the load planning system one or more memory storage areas and at least one computer processor configured for executing the steps of: (A) receiving user input indicating a shipper, a certain origin location, and a time period; (B) retrieving historical shipment data that includes an indication of a past destination location associated with each of one or more packages shipped from the certain origin location for the shipper by one or more shipping entities during the time period; (C) receiving user input indicating a simulation origin location associated with a shipping hub operated by a certain shipping entity; (D) retrieving package routing data for the certain shipping entity, wherein the package routing data includes an indication of a next shipping hub to which each of the one or more packages in the historical shipment data would be shipped from the simulation origin location en route to the past destination location associated with each of the one or more packages; (E) generating a first simulation simulating the shipment of the one or more packages according to the package routing data, wherein generating the first simulation comprises identifying the next shipping hub to which each of the one or more packages would be inbound if shipped from the simulation origin location according to the package routing data; (F) receiving user input indicating one or more modifications to the package routing data; (G) generating modified package routing data based on the modifications; and (H) generating a second simulation simulating the shipment of the one or more packages according to the modified package routing data, wherein generating the second simulation comprises identifying a next shipping hub to which each of the one or more packages would be inbound if shipped from the simulation origin location according to the modified package routing data.

In certain embodiments, generating the first simulation further includes identifying (1) a first subset of the one or more packages destined to a particular next shipping hub if shipped from the simulation origin location according to the package routing data and (2) a number of the one or more packages identified in the first subset. In addition, in a further embodiment, generating the second simulation further includes identifying (2) a second subset of the one or more packages destined to a particular next shipping hub if shipped from the simulation origin location according to the modified package routing data and (2) a number of the one or more packages identified in the second subset.

Various other embodiments include a method for moving packages that includes the steps of: (A) providing a dedicated logistical shipment server configured to: (1) simulate the shipment of various packages according to one or more package routing schemes; (2) select one of the one or more package routing schemes in accordance with user preferences; (3) assign package routing data to one or more packages, wherein the package routing data instructs a shipping entity to ship the one or more packages according to the selected package routing scheme; and (B) shipping the one or more packages through a network of shipping hubs according to the package routing data.

BRIEF DESCRIPTION OF DRAWINGS

Figure 1A:
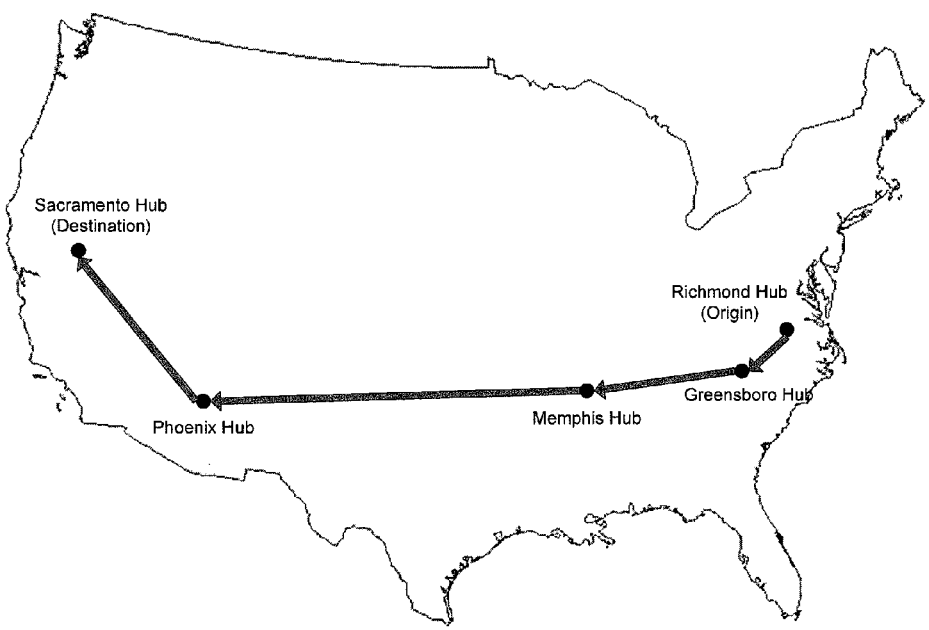
Figure 1B:
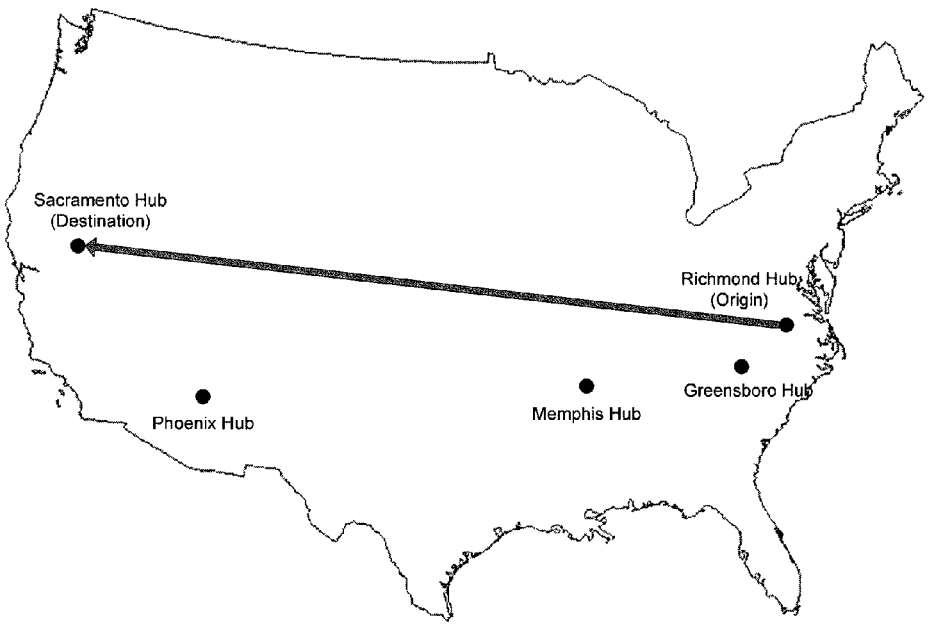

Having thus described various embodiments of the invention in general terms, reference will now be made to the accompanying drawings, which are not necessarily drawn to scale, and wherein:

FIGS. 1A and 1B are diagrams of exemplary shipping routes having one origin location and one destination location according to various embodiments.

Figure 2A:
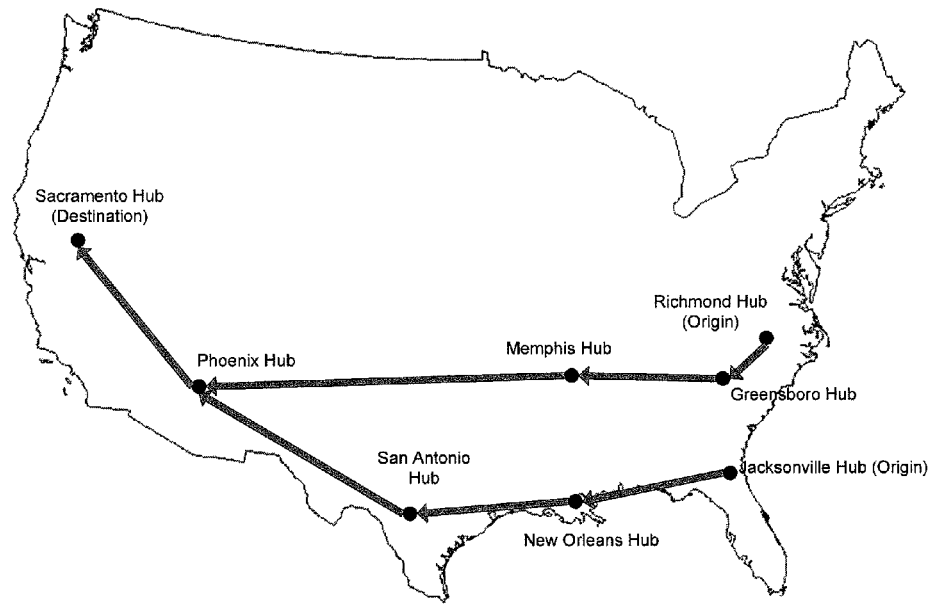
Figure 2B:
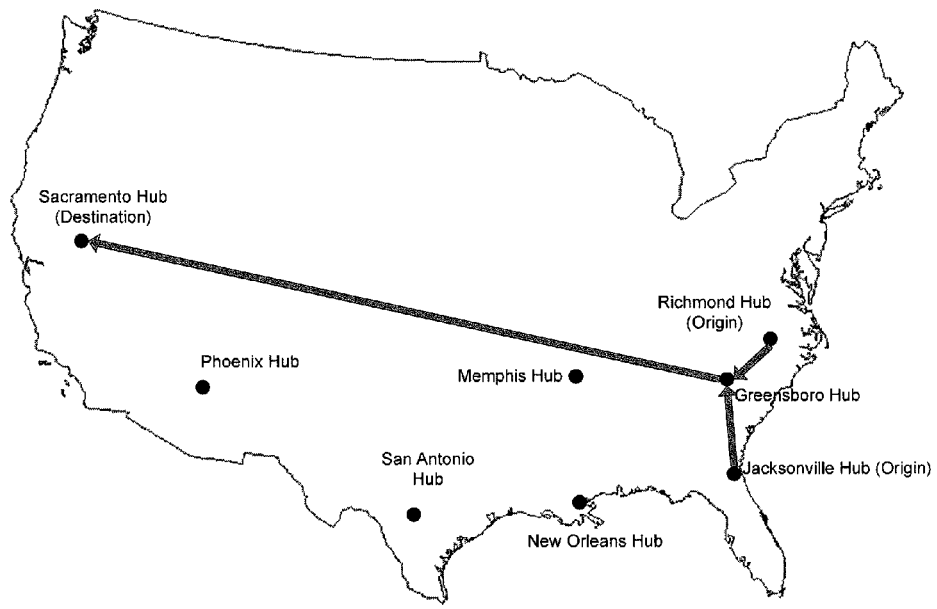

FIGS. 2A and 2B are diagrams of exemplary shipping routes having two origin locations and one destination location according to various embodiments.

Figure 3A:
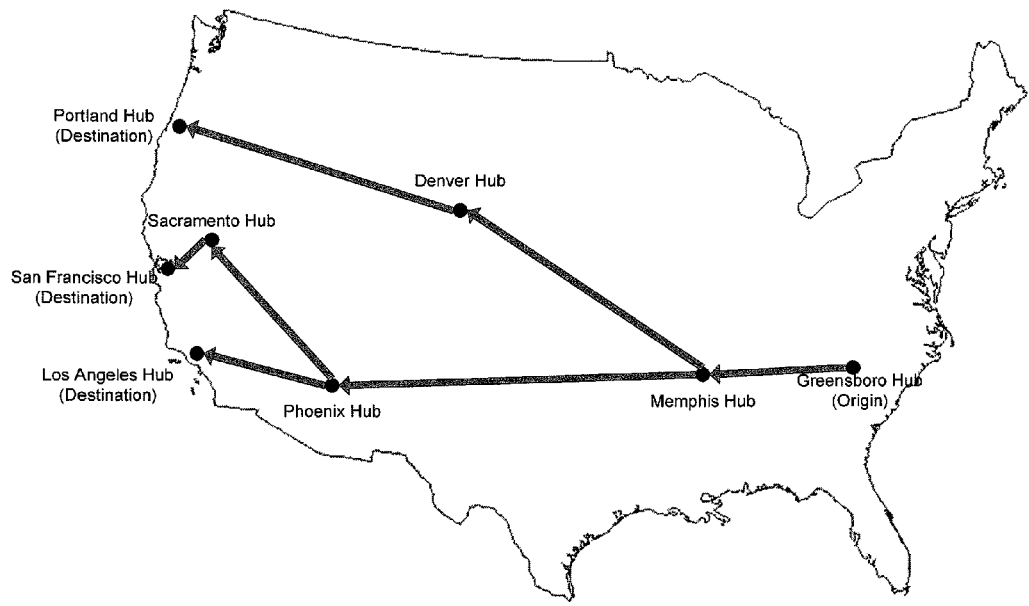
Figure 3B:
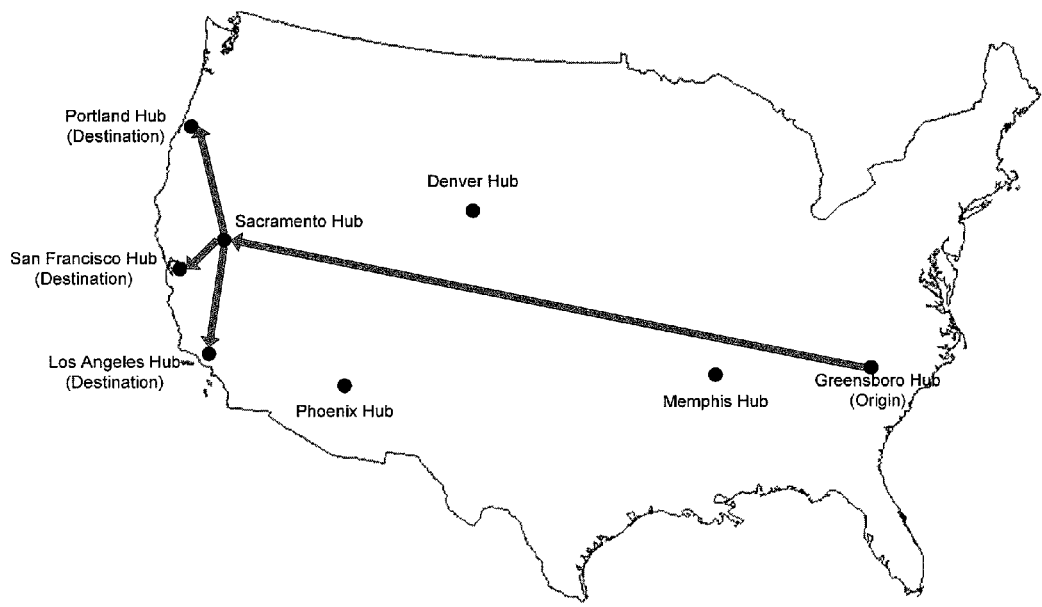

FIGS. 3A and 3B are diagrams of exemplary shipping routes having one origin location and three destination locations according to various embodiments.

Figure 4:
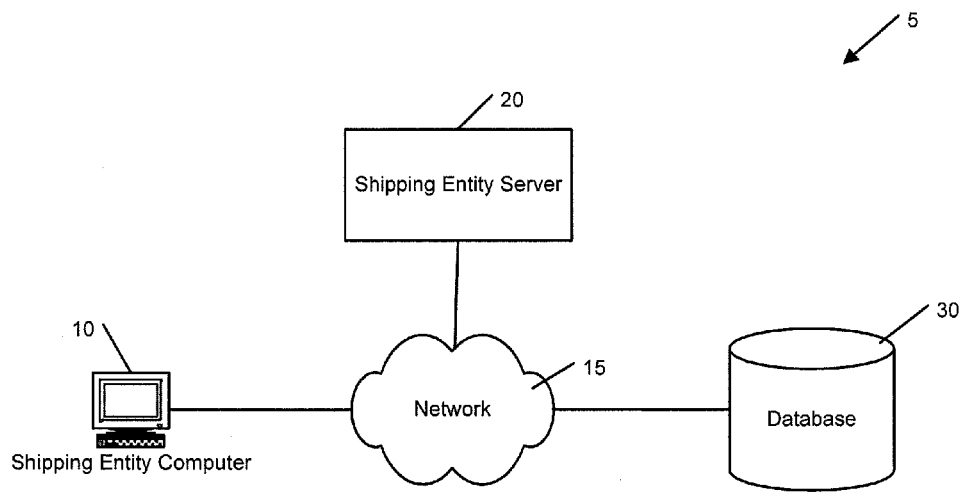

FIG. 4 is a block diagram illustrating a load planning system according to various embodiments.

Figure 5:
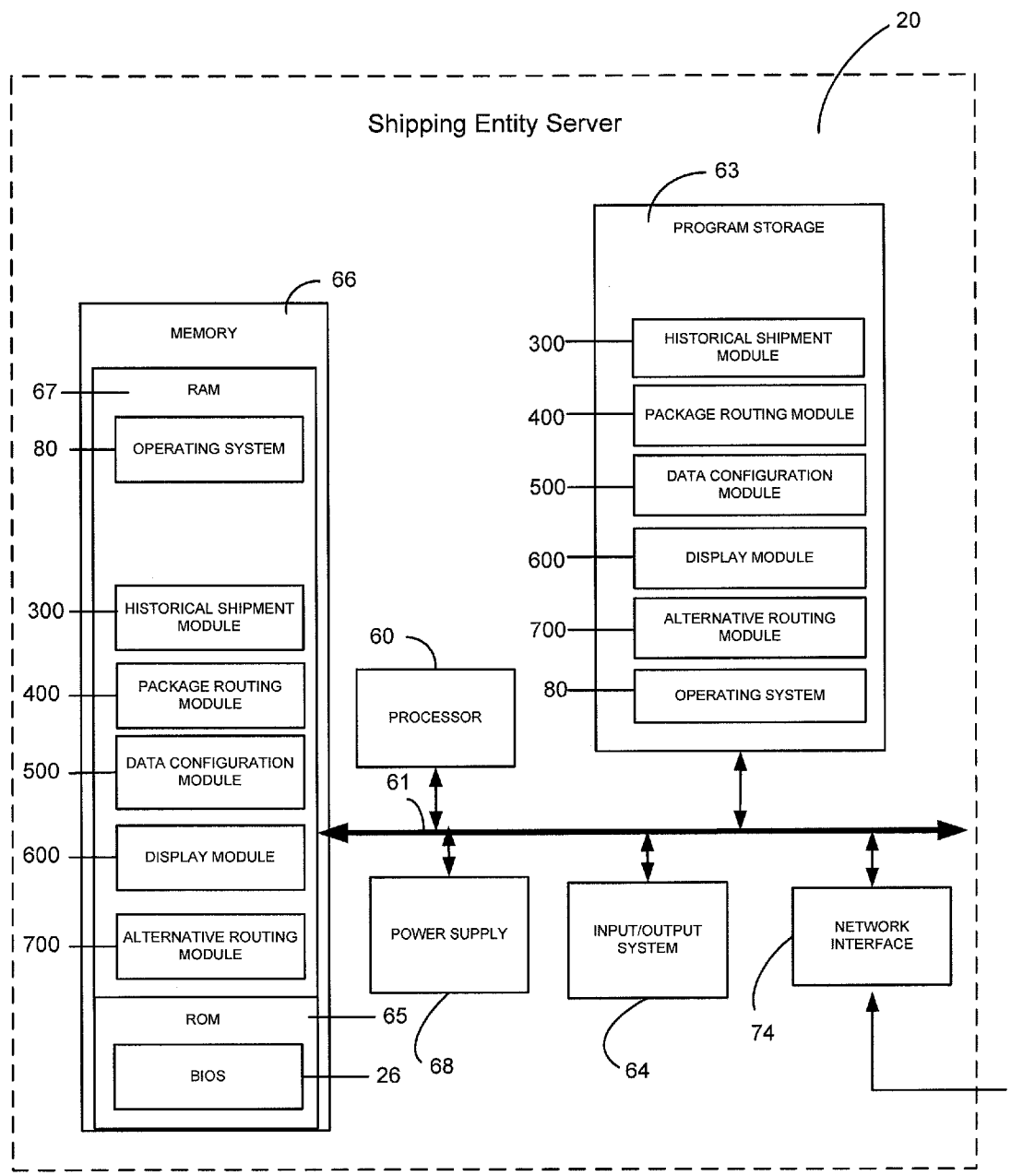

FIG. 5 is a schematic diagram of a shipping entity server according to various embodiments.

Figure 6:
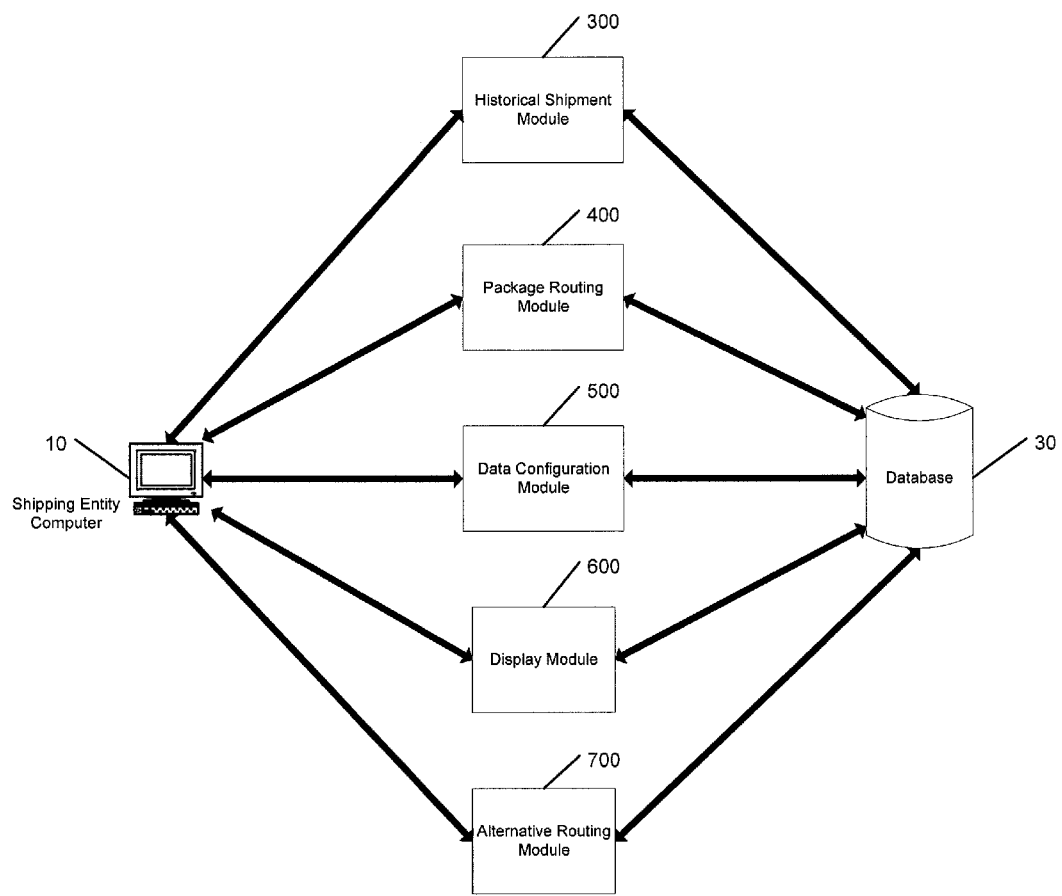

FIG. 6 is a block diagram illustrating the interaction of the modules, computers, and database of the load planning system shown in FIG. 4 according to various embodiments.

Figure 7:
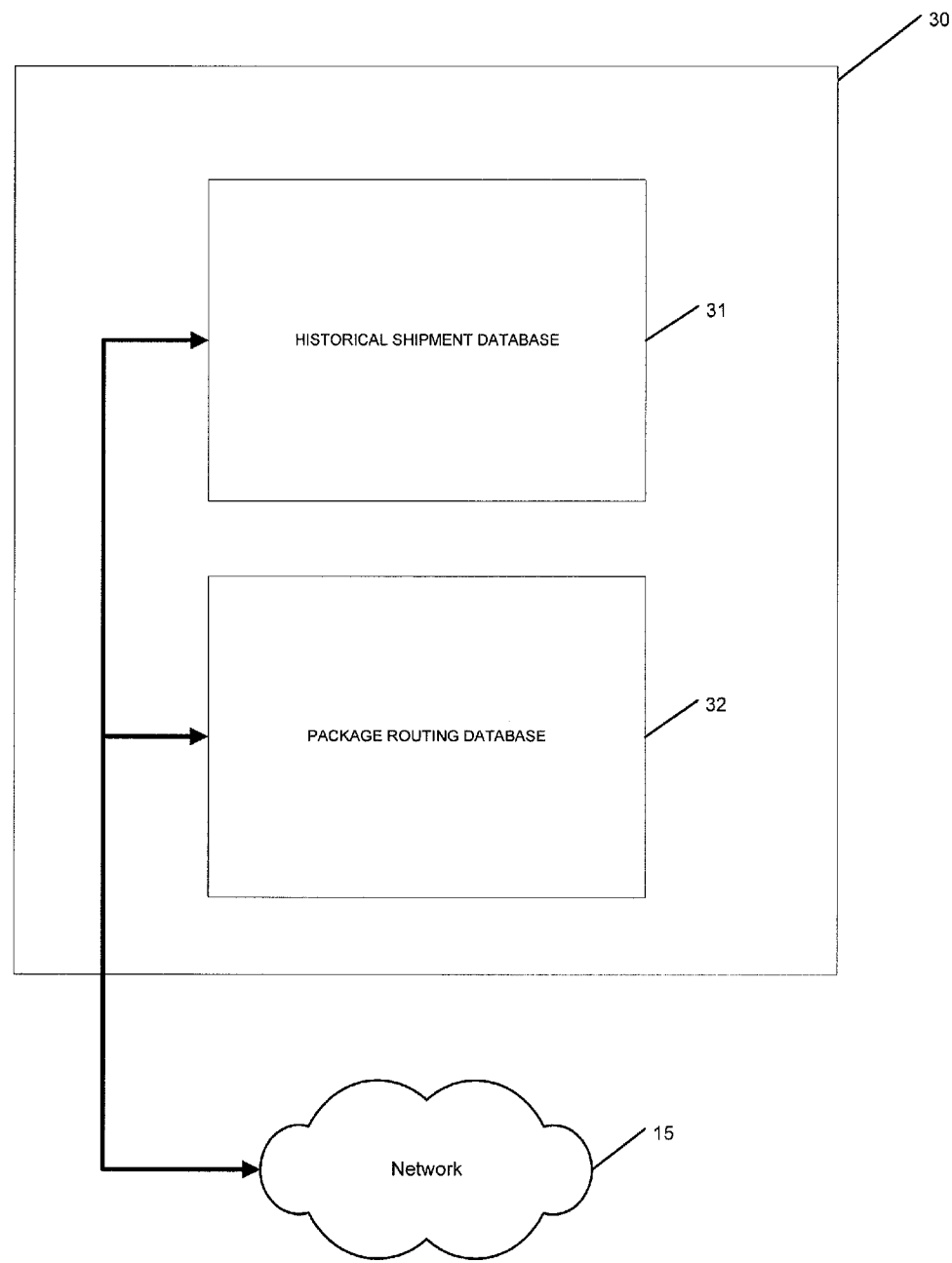

FIG. 7 is a block diagram of a database according to various embodiments.

FIG. 8 is a diagram of exemplary historical shipment data stored in a database according to one embodiment.

FIG. 9 is a diagram of exemplary package routing data stored in a database according to one embodiment.

Figure 10:
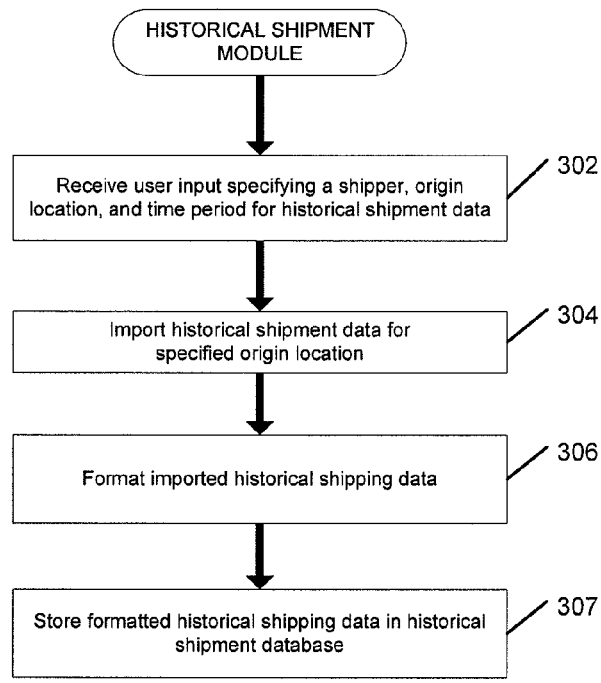

FIG. 10 is a flow diagram of steps executed by the historical shipment module shown in FIG. 5 according to one embodiment.

Figure 11:
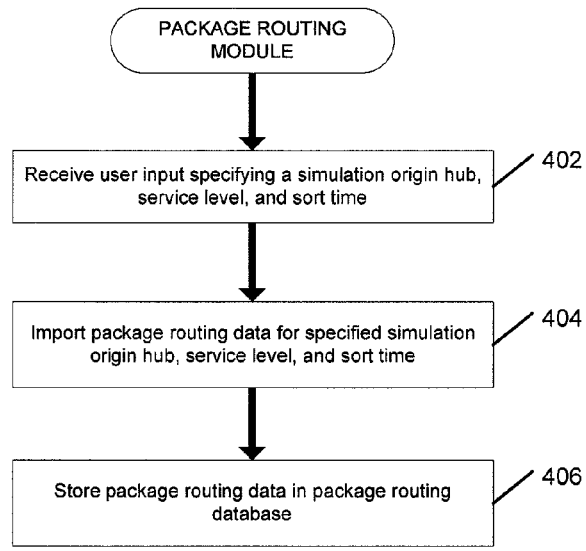

FIG. 11 is a flow diagram of steps executed by the package routing module shown in FIG. 5 according to one embodiment.

Figure 12:
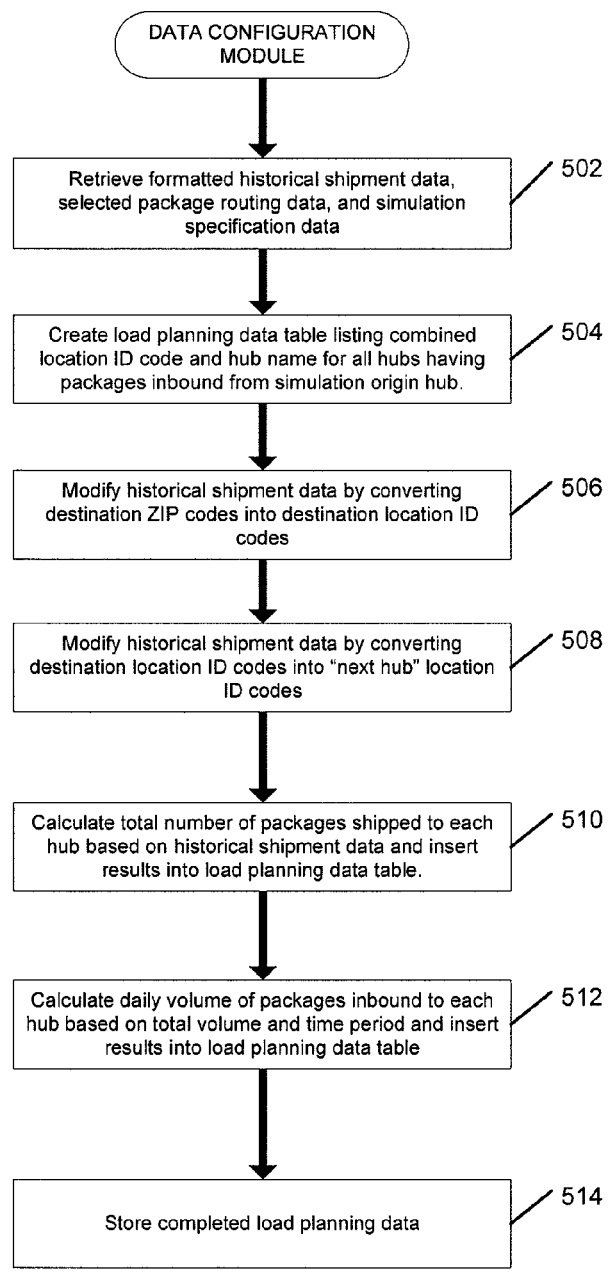

FIG. 12 is a flow diagram of steps executed by the data configuration module shown in FIG. 5 according to one embodiment.

FIG. 13 is a diagram of exemplary load planning data generated by the data configuration module shown in FIG. 12 according to one embodiment.

Figure 14:
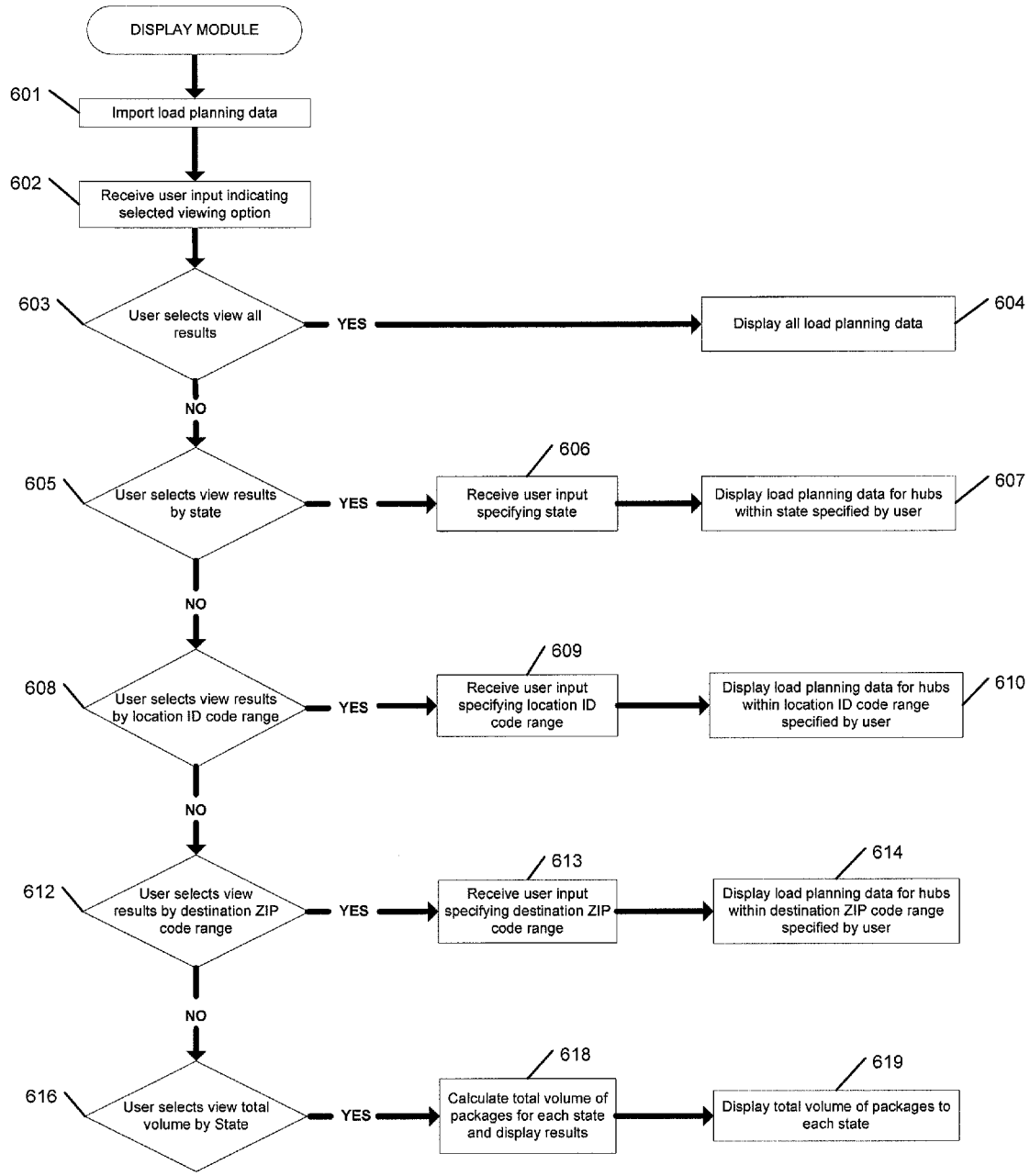

FIG. 14 is a flow diagram of steps executed by the display module shown in FIG. 5 according to one embodiment.

Figure 15:
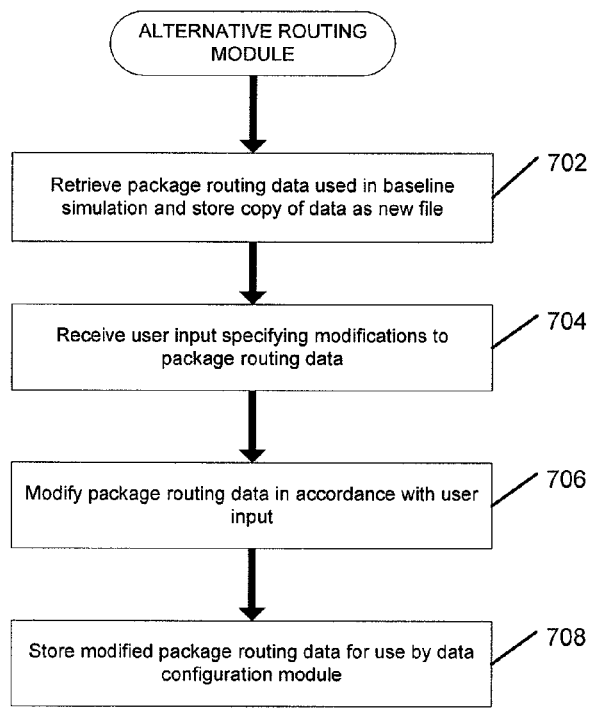

FIG. 15 is a flow diagram of steps executed by the alternative routing module shown in FIG. 5 according to various embodiments.

Figure 16:
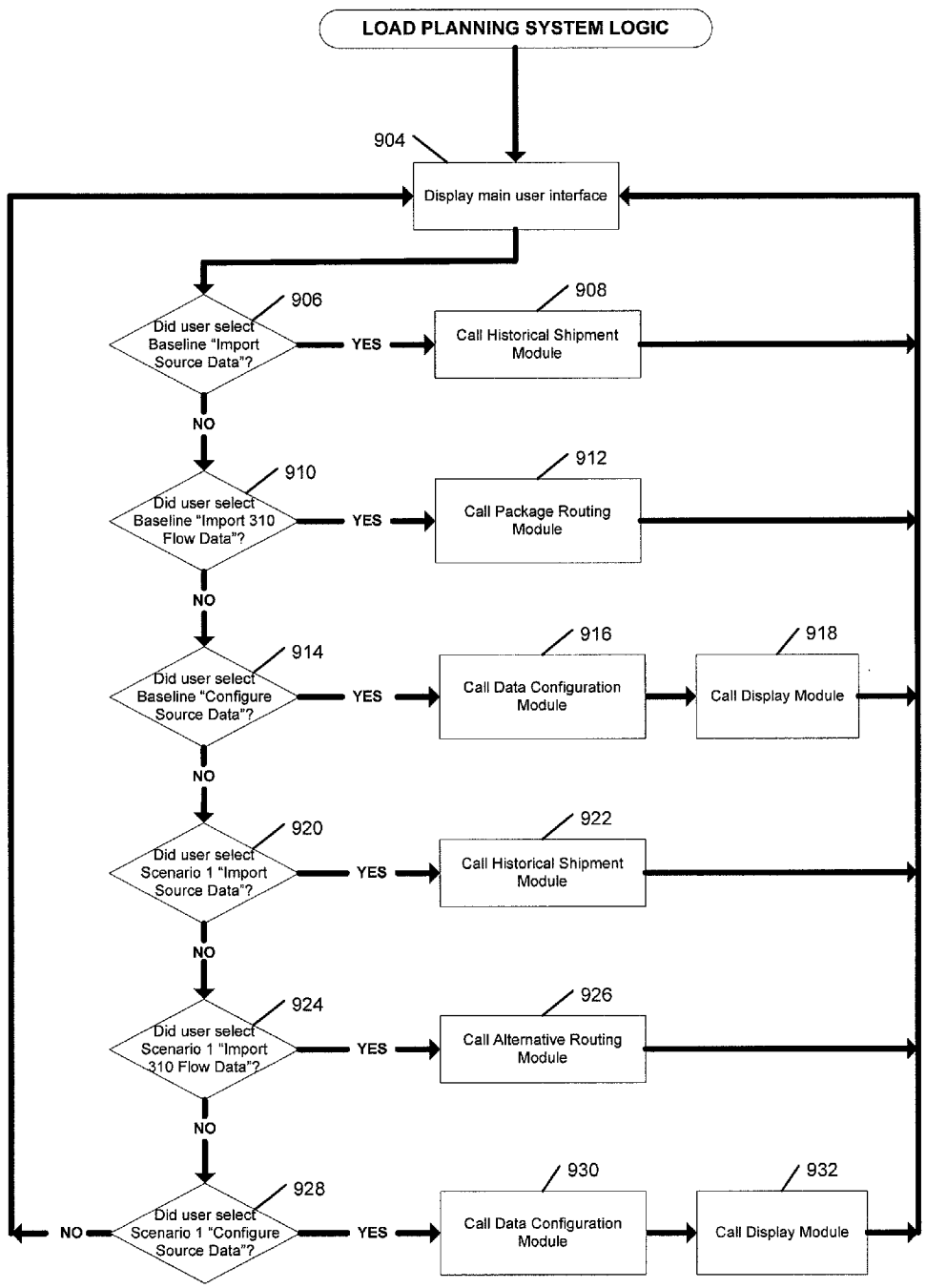

FIG. 16 is a flow diagram of steps executed by the load planning system in response to user input according to one embodiment.

Figure 17:
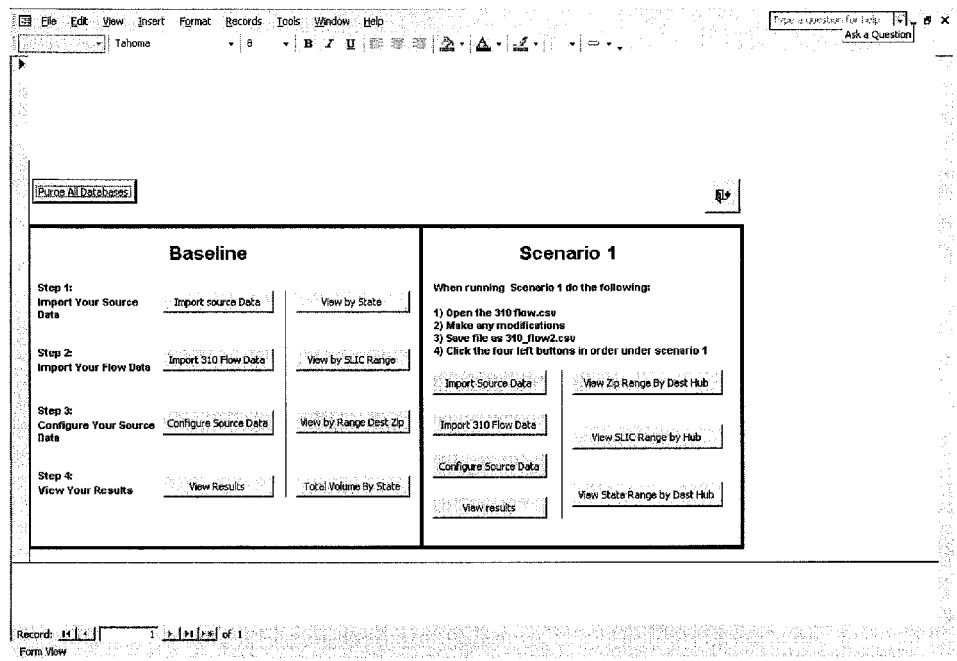

FIG. 17 is a diagram of an exemplary load planning system user interface according to one embodiment.

Figure 18:
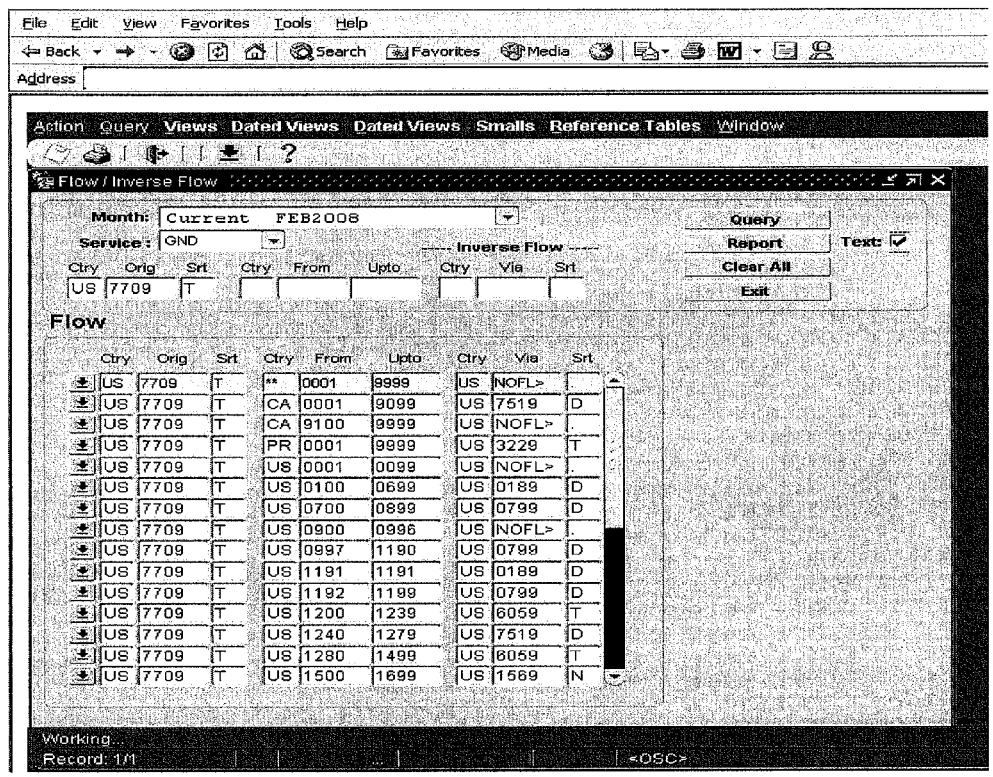

FIG. 18 is a diagram of an exemplary user interface provided by the package routing module shown in FIG. 11 to aid a user in selecting package routing data according to one embodiment.

Figure 19:
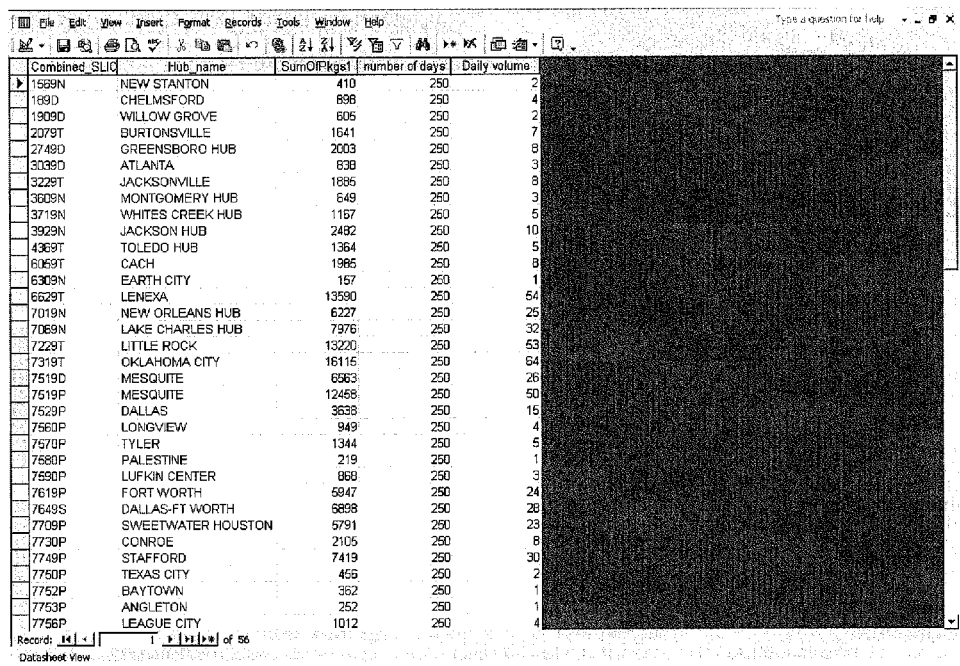

FIG. 19 is a diagram of exemplary load planning data displayed by the display module shown in FIG. 14 according to one embodiment.

DETAILED DESCRIPTION OF VARIOUS EMBODIMENTS OF THE INVENTION

Various embodiments of the present invention now will be described more fully with reference to the accompanying drawings, in which some, but not all embodiments of the invention are shown. Indeed, various embodiments of the invention may be embodied in many different forms and should not be construed as limited to the embodiments set forth herein. Like numbers refer to like elements throughout.

As will be appreciated by one skilled in the art, various embodiments of the present invention may be embodied as a method, a data processing system, or a computer program product. Accordingly, various embodiments of the present invention may take the form of an entirely hardware embodiment, an entirely software embodiment, or an embodiment combining software and hardware aspects. Furthermore, various embodiments of the present invention may take the form of a computer program product on a computer-readable storage medium having computer-readable program instructions (e.g., computer software) embodied in the storage medium. More particularly, various embodiments of the present invention may take the form of web-implemented computer software. Any suitable computer-readable storage medium may be utilized including hard disks, CD-ROMs, optical storage devices, or magnetic storage devices.

Various embodiments of the present invention are described below with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks. Accordingly, blocks of the block diagrams and flowchart illustrations support combinations for performing the specified functions, combinations of steps for performing the specified functions, and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

According to various embodiments of the present invention, a load planning system is provided for simulating shipments based on a shipping entity's planned routing of packages and a shipper's (e.g., shipping entity customer) historical shipping volume. By using the load planning system to simulate shipments according to a variety of package routing plans, a user of the load planning system may identify shipping routes along which certain shipments may by-pass the sorting process of regional shipping hubs. These by-passing routes allow the shipping entity to provide the shipper with more efficient and less costly shipping options according to various embodiments.

In particular, according to various embodiments, the load planning system is configured to aid shipping entities (e.g., United Parcel Service, Inc., FedEx Corp., or the United States Postal Service) in identifying opportunities to build direct shipments for shippers (e.g., a retailer, manufacturer, or other shipper of goods) by simulating the flow of shipments for a given shipper. Using data representing a shipping entity's planned shipping routes and data representing a shipper's past shipments, the load planning system is configured to simulate a shipper's shipments according to the shipping entity's typical shipping routes. The load planning system allows a user to select any shipping entity hub and view the number of simulated packages shipped from the selected hub to each of the shipping entity's other hubs. Based on this initial simulation, the user may identify routes of shipment for which there may be sufficient package volume to build direct shipments and by-pass certain hubs. The load planning system is configured to modify the data representing the shipping entity's planned shipping routes ("package routing data") in accordance with user input and run additional simulations based on the modified package routing data. These subsequent simulations allow the user to view the effects of various routing designs and load combinations and determine the most effective routing options for a given shipper. Various aspects and embodiments of the load planning system are described in more detail below.

For example, in a typical situation, a shipping entity ships packages for a shipper by routing the packages from their origins, through a variety of hubs, and to their destinations. At each hub along the path of a given package, the package is typically received, processed, sorted, and loaded onto a shipping vehicle (e.g., small truck, large truck, train, or airplane) bound for the next hub along the package's planned route. For shippers shipping a large number of packages to a certain region, however, it is often possible for the shipping entity to fill an entire shipping vehicle with packages all being routed to a particular hub. This allows the shipping entity to "build" a direct shipment for the shipper from a first hub to a second hub. This direct shipment of packages by-passes the sorting process at the first hub and at any intermediate hubs where the packages would have otherwise been sorted en route to the second hub. Accordingly, direct shipments may comprise an entire shipping route (e.g., a direct shipment from a package origin to a package destination by-passing all intermediate hubs) or a portion of a shipping route (e.g., a direct shipment from one intermediate hub to another intermediate hub by-passing certain hubs in between).

FIGS. 1A and 1B show exemplary shipping routes for packages being routed from a shipping hub in Richmond, Va. to a shipping hub in Sacramento, Calif. Packages following the exemplary paths shown in FIGS. 1A and 1B may be shipped from a location near Richmond, where they are picked up and delivered to the Richmond hub, to a location near Sacramento, where they are delivered from the Sacramento hub. In particular, FIG. 1A shows a typical shipping route for these packages in which the packages are stopped and sorted at hubs in Greensboro, Memphis, and Phoenix before arriving at the Sacramento hub.

If, however, a shipper is shipping enough packages routed from Richmond to Sacramento to fill an entire shipping vehicle, the packages may follow the route illustrated in FIG. 1B. For example, the daily volume of packages shipped by the shipper may be sufficient to fill the shipping vehicle, or the shipper may be willing to hold packages for a certain number of days until a sufficient number of packages are ready for shipment. FIG. 1B shows an exemplary route where a shipment is built from Richmond to Sacramento by loading packages directly onto a shipping vehicle at the Richmond hub and shipping them directly to the Sacramento hub. The packages shipped along the route of FIG. 1B will reach Sacramento faster and at a lesser cost than packages shipped along the route of FIG. 1A as they are not being sorted in Richmond, Greensboro, Memphis, and Phoenix.

If the shipper of the packages is not shipping enough packages to build a direct shipment from Richmond to Sacramento, as shown in FIG. 1B, and is not willing to hold packages, it may still be possible to build a direct shipment to Sacramento by combining shipments from two different origin hubs. FIGS. 2A and 2B show exemplary shipping routes for packages being routed from shipping hubs in Richmond, Va. and Jacksonville, Fla. to a shipping hub in Sacramento, Calif. FIG. 2A shows a typical shipping route for these packages in which packages routed from Jacksonville are sorted in New Orleans, San Antonio, and Phoenix, while packages routed from Richmond are sorted in Greensboro, Memphis, and Phoenix. If the combined number of packages shipped from Richmond and Jacksonville is enough to fill an entire shipping vehicle, the packages may follow the route illustrated in FIG. 2B according to one embodiment. FIG. 2B shows an exemplary route where a shipment is built from Greensboro to Sacramento using packages routed from Jacksonville and Richmond. The packages shipped along the route of FIG. 2B will reach Sacramento faster and at a lesser overall cost than packages shipped along the route of FIG. 2A as they are being stopped and sorted only twice—at their respective origin hubs and in Sacramento.

A similar approach may also be used to build a direct shipment by combining shipments from a single origin hub to multiple destination hubs. FIGS. 3A and 3B show exemplary shipping routes for packages being routed from Greensboro, N.C. to Portland, Oreg.; San Francisco, Calif.; and Los Angeles, Calif. FIG. 3A shows a typical shipping route for these packages. If the combined number of packages shipped from Greensboro to all three west-coast destinations is enough to fill an entire shipping vehicle, the packages may follow the route illustrated in FIG. 3B. FIG. 3B shows an exemplary route where a shipment is built from Greensboro to Sacramento using shipments bound for Portland, San Francisco, and Los Angeles. Although the packages must be sorted in Sacramento and routed to their final destination hubs, they will reach their final destinations faster and at a lesser overall cost than if they were shipped along the route of FIG. 3A. If shipped along the route of FIG. 3B, each group of packages will be sorted twice—in Sacramento and in their respective destination hubs. If shipped along the route of FIG. 3A, the packages would be sorted no less than four times.

System Architecture

A load planning system 5 according to one embodiment is shown in FIG. 4. In the illustrated embodiment, the system 5 includes at least one shipping entity computer 10 and a shipping entity server 20. These components are connected via a network 15 (e.g., a LAN or the Internet). The load planning system 5 is configured for storing data to an accessible database 30 that may be stored on (or, alternatively, stored remotely from) the shipping entity server 20.

FIG. 5 is a schematic diagram of the shipping entity server 20 according to various embodiments. The shipping entity server 20 includes a processor 60 that communicates with other elements within the shipping entity server 20 via a system interface or bus 61. Also included in the shipping entity server 20 is a display device/input device 64 for receiving and displaying data. This display device/input device 64 may be, for example, a keyboard or pointing device that is used in combination with a monitor. The shipping entity server 20 further includes memory 66, which preferably includes both read only memory (ROM) 65 and random access memory (RAM) 67. The server's ROM 65 is used to store a basic input/output system 26 (BIOS), containing the basic routines that help to transfer information between elements within the shipping entity server 20.

In addition, the shipping entity server 20 includes at least one storage device 63, such as a hard disk drive, a floppy disk drive, a CD ROM drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 65. Such program modules include an operating system 80, a historical shipment module 300, a package routing module 400, a data configuration module 500, a display module 600, and an alternative routing module 700. According to various embodiments, the historical shipment module 300, package routing module 400, data configuration module 500, display module 600, and alternative routing module 700 control certain aspects of the operation of the shipping entity server 20 with the assistance of the processor 60 and operating system 80. In general, the historical shipment module 300 is configured to import, format, and store historical shipment data representing a shipper's past shipments. The package routing module 400 is configured to import and store package routing data representing a shipping entity's planned shipping routes. The data configuration module 500 is configured to use historical shipment data and package routing data to generate load planning data representing the number of packages bound for various shipping hubs from a user-selected origin hub during a defined period of time. The display module 600 is configured to provide a user with visibility to the load planning data generated by the data configuration module 500 according to various viewing options and user preferences. The alternative routing module 700 is configured to modify package routing data according to user input and store the modified package routing data. Embodiments of these modules are described in more detail below in relation to FIGS. 6-15.

In a particular embodiment, these program modules 300, 400, 500, 600, and 700 are executed by the shipping entity server 20 and are configured to generate graphical user interfaces accessible to shippers via the Internet or other communications network. In other embodiments, one or more of the modules 300, 400, 500, 600, and 700 may be stored locally on the one or more shipping entity computers 10 and executed by one or more processors of the shipping entity computer 10. According to various embodiments, the modules 300, 400, 500, 600, and 700 may send data to, receive data from, and utilize data contained in, the database 30. In addition, the database 30 may be comprised of one or more separate, linked databases.

Also located within the shipping entity server 20 is a network interface 74, for interfacing and communicating with other elements of a computer network. It will be appreciated by one of ordinary skill in the art that one or more of the shipping entity server 20 components may be located geographically remotely from other shipping entity server 20 components. Furthermore, one or more of the components may be combined, and additional components performing functions described herein may be included in the shipping entity server 20.

FIG. 6 illustrates the working relationship between the above-mentioned database, modules, and computers according to various embodiments of the invention. In particular, the historical shipment module 300 sends data to and receives data from a shipping entity computer 10, and retrieves and stores data on the database 30. The package routing module 400 sends data to and receives data from the shipping entity computer 10, and retrieves and stores data on the database 30. The data configuration module 500 sends data to and receives data from shipping entity computer 10, and retrieves and stores data on the database 30. The display module 600 sends data to and receives data from shipping entity computer 10, and retrieves and stores data on the database 30. The alternative routing module 700 sends data to and receives data from the shipping entity computer 10, and retrieves and stores data on the database 30. In various embodiments, a multiple computers may send data to the historical shipment module 300, package routing module 400, data configuration module 500, display module 600, and alternative routing module 700. Embodiments of the database 30 each of the modules 300, 400, 500, 600, 700 are discussed in more detail below.

Database

According to various embodiments, the database 30 is configured to store historical shipment data representing the past shipments of a shipper, package routing data representing the planned shipment routes of a shipping entity, modified versions of historical shipment data and package routing data, and various other data used by the load planning system 5. According to various embodiments, the database 30 is configured such that the data contained in the database 30 may be created, modified, read, copied, or otherwise manipulated by the various modules 300, 400, 500, 600, 700 and computer 10. In certain embodiments, the database 30 may be a special-purpose database dedicated for use by the load planning system 5. In these embodiments, the load planning system 5 may import data from other databases or mediums and store data on the database 30. In other embodiments, the database 30 may be a general-purpose database used by the shipping entity to store various data that is also configured for use by the load planning system 5. In these embodiments, the load planning system 5 may import data from one location on the database 30 and store data for use in another location on the database 30.

As illustrated in FIG. 7, in one embodiment, the database 30 is dedicated to the load planning system 5 and comprised of two separate and linked databases—a historical shipment database 31 and a package routing database 32. In one embodiment, the historical shipment database 31 is configured to store historical shipment data imported and formatted by the load planning system 5. FIG. 8 shows exemplary historical shipment data formatted and stored in the historical shipment database 31 according to one embodiment. The historical shipment data indicates the number of packages and total weight of packages comprising various shipments made for a particular shipper from a certain origin location (e.g., particular address, ZIP code, region, city, state) to various destination locations (e.g., particular address, ZIP code, region, city, state) during a defined period of time. The exemplary historical shipment data includes the following information for each shipment: the origin country of the packages, the origin ZIP code of the packages, the origin state of the packages, the destination country of the packages, the ZIP code of the packages, the destination state of the packages, the number of packages shipped, the total weight of the packages shipped, and the service level at which the packages were shipped (e.g., ground, two-day air, next-day air). For example, the first line of the exemplary historical shipment data in FIG. 8 indicates that a shipment of 24 packages weighing 446 units (e.g., pounds, kilograms) was shipped at the Ground service level (i.e., GND) from Wake Forest, N.C. (i.e., ZIP code 27587) to Palmdale, Calif. (i.e., ZIP code 93551). Viewing all rows of data for shipments from ZIP code 27587 to ZIP code 93551 indicates that six separate shipments from Wake Forest to Palmdale were made during the time period represented by the data. As the historical shipment data is stored according to a certain origin location, the origin country, origin ZIP code, and origin state for each group of packages shown in FIG. 8 are the same.

The exemplary historical shipment data shown in FIG. 8 represents only one embodiment of historical shipment data that may be used by the load planning system 5. Indeed, the load planning system 5 may be configured to use historical shipment data arranged in a variety of formats containing the information necessary to simulate shipments for a shipper. The load planning system 5 may also be configured to use historical shipment data stored on other databases or mediums accessible by the load planning system 5. In certain embodiments, the historical shipment data may represent international shipments or shipments within foreign countries (i.e., not the United States). In other embodiments, the historical shipment data may be created by the shipper or load planning entity based on estimated or predicted shipments or shipment volume, rather than records of actual past shipments.

In one embodiment, the package routing database 32 is configured to store package routing data. The package routing data for a given shipping hub indicates the next hub to which any package outbound from the shipping hub will be routed based on the package's destination hub. For example, in the shipping route shown in FIG. 1A, the package routing data for the Greensboro hub would indicate that all packages destined for Sacramento will be shipped next to Memphis. Likewise, the package routing data for the Memphis hub would indicate that all packages destined for Sacramento will be shipped next to Phoenix. According to certain embodiments, each shipping hub operated by a shipping entity may have a unique set of package routing data assigned for each combination of service level (e.g., ground, two-day air, next-day air) and sorting period (e.g., day, twilight, night, and sunrise). For example, the package routing data used for packages being shipped next-day air and sorted during the twilight period may be unique from the package routing data used for packages being shipped via a ground service level and sorted during the sunrise period. In other embodiments, the package routing data may also vary according to a particular time period (e.g., week, month, or certain date range). For example, the shipping entity may route shipments carried out in the summer months differently from those carried out in the winter months.

In one embodiment, package routing data is formatted and stored in the package routing database 32 as illustrated in FIG. 9. As shown in FIG. 9, the "Current Country" and "Current Location ID Code" columns of the exemplary package routing data indicate the shipping hub to which the data is assigned. According to various embodiments, each shipping hub operated by the shipping entity is assigned a unique location identification code ("location ID code"). For example, in the exemplary data of FIG. 9, the shipping hub to which the data is assigned is in the United States and has been assigned 7709 as its location ID code. The "Current Sort" column of the exemplary package routing data indicates that the data is provided for the twilight sort (i.e., "T"). As the exemplary package routing data shown in FIG. 9 is representative of an embodiment in which unique package routing data is provided for each shipping hub, service level, and sort time combination, the entries in the "Current Country," "Current Location ID Code," and "Current Sort" columns are the same for each row of data.

As described above, the exemplary package routing data indicates the next hub to which outbound packages will be routed based on the last shipping hub (i.e., the destination hub) to which the package will be routed. Accordingly, each row of data shown in FIG. 9 has a unique range of destination location ID codes. In the illustrated embodiment, location ID codes are assigned to shipping hubs based, in-part, on the ZIP code in which the shipping hubs are located. For example, a shipping hub in Wake Forest, N.C. (i.e., ZIP code 27587) may be assigned a location ID code of 2758. As a result of the geographic relationship of zip codes, packages being shipped to final destination hubs having location ID codes close in number to one another are typically routed through the same hubs en route to their final destination. For example, the exemplary package routing data indicates that all packages being shipped to a destination hub in the United States ("Destination Country") having a location ID code between 0100 ("Destination Location ID Start") and 0699 ("Destination Location ID End") will be shipped next to a shipping hub having location ID Code 0189 ("Next Hub") and will be sorted during the day sort ("Next Hub Sort"). In other words, the exemplary package routing data indicates that any package leaving shipping hub 7709 that is bound for a shipping hub between 0100 and 0699 will be sent next to shipping hub 0189 and sorted during the day period ("Next Hub Sort").

As is shown in FIG. 9, the exemplary package routing data adheres to this format along each row of data and details the next hub to which any outbound package will be shipped. In some instances, the next hub for certain destination ranges is listed as having no flow, or "NOFL>." This designation may appear in at least three situations. First, where there are no shipping hubs assigned to a location ID code within the specified destination range, the data may indicate no flow of packages to that range of destinations. Second, when the hub to which the package routing data is assigned has a location ID code within the range of destinations, the data may reflect no flow to another hub. Third, where a shipping entity's planned package routes do not, under the circumstances defining the package routing data, route packages destined for the given range of destinations through the current shipping hub, the data may indicate no flow. For example, if all packages outbound from shipping hub 7709 destined for shipping hub 0900 are held until the sunrise period sort, package routing data for the twilight sort of hub 7709 may indicate no flow for packages destined for hub 0900.

The exemplary package routing data shown in FIG. 9 represents only one embodiment of package routing data that may used by the load planning system 5. In certain embodiments, package routing data may be more unique than the exemplary data of FIG. 9 (e.g., data further arranged by the month in which packages are shipped). In other embodiments, package routing data may be less unique than the exemplary data of FIG. 9 (e.g., data not arranged according to sort time). In further embodiments, the package routing data may be configured to represent the routing of international or foreign shipments. Indeed, the load planning system 5 may be configured to use package routing data arranged in a variety of formats containing information necessary to simulate shipments for a shipper. The load planning system 5 may also be configured to use package routing data stored on other databases or mediums accessible by the load planning system 5.

It should be understood that the load planning system 5 may be configured to operate based on data differing from the exemplary data shown in FIGS. 8 and 9. In addition, the data shown in FIGS. 8 and 9 represents only a portion of the data that may be stored in the database 30. Indeed, the database 30 may be configured to store all data necessary to operate various embodiments of the load planning system 5. In addition, the database 30 may be comprised of additional separate, linked databases configured to store additional information used by the load planning system 5.

As noted above, the load planning system 5 may include various modules such as the historical shipment module 300, package routing module 400, data configuration module 500, display module 600, and alternative routing module 700. The following paragraphs describe aspects of these modules.

Historical Shipment Module

According to various embodiments, the historical shipment module 300 is configured to import, format, and store historical shipment data for use in load planning simulations. As described above in relation to FIG. 8, the historical shipment data includes information regarding past shipments or hypothetical shipments made for a particular shipper from a certain origin location to various destinations. Depending on the shipper, these past shipments may have been carried out by either the load planning shipping entity (e.g., the shipping entity using the load planning system 5 to simulate shipments for the shipper) or by another shipping entity. As a result, the historical shipment data imported by the load planning system 5 may be stored by the load planning shipping entity in an easily accessible location and in a familiar format, or stored by the shipper or another shipping entity in a less accessible location and in an unfamiliar format. Thus, according to various embodiments, the historical shipment module 300 is configured to import and format the historical shipment data in a variety of ways, as is described below.

FIG. 10 illustrates exemplary steps executed by the historical shipment module 300 according to one embodiment. Beginning with step 302, the historical shipment module 300 receives user input specifying a shipper, origin location, and period of time for which historical shipment data is desired. In one embodiment, the user inputs this information via a user interface provided by historical shipment module 300. In another embodiment, the user may input the information via a user interface provided on a website. In yet another embodiment, where the historical shipment data is stored in a medium directly accessible to the load planning system 5, the user may use an operating system (e.g., Microsoft Windows) running on the shipping entity computer 10 to locate a file containing the desired historical shipment data stored on the database 30. In this embodiment, the user implicitly specifies a shipper, origin location, and time period by selecting the appropriate file. In one embodiment, where the historical shipment data contained in the selected file is not limited to a particular time frame, the historical shipment module 300 is configured to retrieve the appropriate data from the file based on user input specifying a certain period of time. In other embodiments, where the desired historical shipment data is stored by the shipper in a medium inaccessible by the load planning system 5, the historical shipment module 300 is configured to send a request to the shipper for historical shipment data specifying the origin location and the period of time for which historical shipment data is needed. This request may be generated and sent to shipper via e-mail, an on-line user interface, letter, or other communicative medium.

Next, in step 304, the historical shipment module 300 imports the historical shipment data specified in step 302. Where a simulation is based on past shipments made by the load planning shipping entity, the historical shipment data may be located in the load planning shipping entity's records (e.g., shipment records, billing records, etc.) and stored in a database linked to the load planning system 5. Accordingly, in one embodiment, the historical shipment module 300 is configured to automatically locate and import the requested historical shipment data from a database linked to the load planning system 5 based on user input provided in step 302. In another embodiment, the historical shipment module 300 is configured to import a particular file selected by the user in step 302 from a shipping entity database linked to the load planning system 5 (e.g., the database 30).

Where a simulation is based on past shipments made by another shipping entity, the historical shipment data may be located in a shipper's records (e.g., billing records, shipment records, etc.) and stored on a database that is not linked to the load planning system 5. Accordingly, in one embodiment, the historical shipment module 300 is configured to import historical shipment data provided by the shipper or a third-party in response to a request generated in step 302. In this embodiment, historical shipment data may be made accessible to the historical shipment module 300 via e-mail, posting on a website, storage on a computer-accessible device provided to the shipping entity, or other data-transferring medium. In yet another embodiment, a shipper computer containing the desired historical shipment data is linked to the shipping entity server 20 via the network 15. In this embodiment, the historical shipment module 300 is configured to import historical shipment data directly form the shipper computer.

Next, in step 306, the historical shipment module 300 formats the historical shipment data imported in step 304 into a standard historical shipment data format. As a result of the different potential sources of historical shipment data, the historical shipment data imported by the historical shipment module 300 may be in a format that differs from the exemplary data shown in FIG. 8 (i.e., a format not used by the load planning shipping entity). Accordingly, in one embodiment, the historical shipment module 300 determines whether the imported historical shipment data is in an improper format and, if so, formats the data such that it is arranged according to the exemplary data of FIG. 8. In other embodiments, the historical shipment module 300 may be configured to format the historical shipment data into arrangements that differ from that of FIG. 8. In certain embodiments, where a simulation is based on shipments in the United States, the historical shipment module 300 is also configured to automatically remove historical shipment data that pertains to non-domestic shipments.

Next, in step 308, the historical shipment module 300 stores the formatted historical shipment data. According to various embodiments, the historical shipment module 300 is configured to store the formatted historical shipment data in the memory 66 of the shipping entity server 20, in the historical shipment database 31, or in another medium accessible to the shipping entity server 20. In certain embodiments (not shown in FIG. 10), where the time period represented by the historical shipment data is not indicated in the data itself, the historical shipment module 300 is also configured to create and store a set of simulation specification data that includes the time period represented by the associated historical shipment data.

In addition, in one embodiment, the historical shipment module 300 is further configured to allow a user to combine historical shipment data from multiple origin locations. For example, a user may wish to combine the historical shipment data for packages shipped from location A and location B. In this embodiment, the historical shipment module 300 provides a user interface that presents the user with the option to combine data. Upon user-selection of this option, the user interface allows the user to select two separate sets of historical shipment data in a manner similar to that described above. The historical shipment module 300 then automatically combines the historical shipment data into one file for use in load planning simulations.

Package Routing Module

According to various embodiments, the package routing module 400 is configured to import and store package routing data representing a shipping entity's planned shipping routes. As described above in relation to FIG. 9, the package routing data includes information regarding planned shipping routes for packages outbound from a particular shipping hub. In certain embodiments, this data is proprietary information of the load planning shipping entity and is stored on a database or other medium accessible by the load planning system 5.

FIG. 11 illustrates exemplary steps executed by the package routing module 400. Beginning with step 402, the package routing module 400 receives user input specifying a simulation origin hub, service level, and sort time for which package routing data is needed. In one embodiment, the user inputs this information via a user interface on the shipping entity computer 10. In another embodiment, the user inputs the information via a user interface provided on a website. In yet another embodiment, the user specifies a simulation origin hub by using an operating system (e.g., Microsoft Windows) running on the shipping entity computer 10 to locate a file containing the desired package routing data stored on a database linked to the load planning system 5. In this embodiment, the user implicitly specifies a simulation origin hub by selecting the appropriate file.

Next, in step 404, the package routing module 400 locates and imports the package routing data specified in step 402. In one embodiment, the package routing module 400 is configured to automatically locate and import the requested package routing data from a database linked to the load planning system 5 based on the user input provided in step 402. In another embodiment, the package routing module 400 imports a particular file selected by the user in step 402. In certain embodiments, the package routing module 400 is also configured to format the imported package routing data such that it is arranged according to the illustrated exemplary data in FIG. 9.

Next, in step 406, the package routing module 400 stores the imported package routing data. According to various embodiments, the package routing module 400 is configured to store the imported package routing data in the memory 66 of the shipping entity server 20, in the package routing database 32, or in another medium accessible to the shipping entity server 20. In certain embodiments, the package routing module 400 is also configured to create a set of simulation specification data that indicates the simulation origin and/or sort time associated with the package routing data, or modify an already existing set of simulation specification data to indicate the same.

In a further embodiment, the package routing module 400 is configured to receive user-input specifying a country and month for which package routing data is needed. This is helpful when package routing data is changed by a shipping entity according to time of year. In this embodiment, the package routing module 400 is further configured to retrieve package routing data according to these additional parameters. In another embodiment, the package routing module 400 is configured to receive a range of shipping hubs (e.g., by ZIP code or location ID code) for which package routing data is needed. In this embodiment, the package routing module 400 is configured to import package routing data pertaining to these shipping hubs. In certain embodiments, the package routing module 400 is configured to receive additional user-input pertaining to package routing data and import the appropriate package routing data accordingly. In other embodiments, where package routing data is not arranged by as many parameters, the package routing module 400 is configured to receive less user-input and import package routing data accordingly.

Data Configuration Module

According to various embodiments, the data configuration module 500 is configured to use the formatted historical shipment data stored by the historical shipment module 300 and the package routing data stored by the package routing module 400 to generate load planning data indicating the simulated number of packages bound for various shipping hubs from the user-selected simulation origin hub during a defined period of time. The load planning data generated by the data configuration module 500 allows the user to view the volume and flow of packages outbound from the simulation origin hub based on the selected historical shipment data.

FIG. 12 illustrates exemplary steps executed by the data configuration module 500 in generating load planning data according to one embodiment, and FIG. 13 illustrates exemplary load planning data generated by the data configuration module 500 according to one embodiment. Beginning at step 502, shown in FIG. 12, the data configuration module 500 retrieves the formatted historical shipment data stored by the historical shipment module 300, the selected package routing data stored by the packaging routing module 300, and the simulation specification data generated by both modules 300, 400. Next, in step 504, the data configuration module 500 creates a load planning data table listing all hubs having packages inbound from the simulation origin hub as specified in the package routing data (e.g., see hubs listed in "next hub" column in FIG. 9). In the exemplary load planning data shown in FIG. 13, the names of each hub are listed along with a combined location ID code representing each hub's location ID code followed by the letter representing the sort time for packages inbound from the simulation origin hub. For example, the first hub listed in the exemplary data of FIG. 13 is "New Stanton," which is assigned a combined location ID code "1596N" representing the New Stanton hub's location ID code (1596) and the sorting period during which packages inbound from the simulation origin hub (i.e., hub 7709 in FIG. 9) will be processed (N or night).

Next, in step 506, the data configuration module 500 modifies the historical shipment data by converting the ZIP codes listed for each shipment into location ID codes associated with the shipping hubs assigned to each ZIP code. In one embodiment, the load planning shipping entity provides location ID code data stored on the database 30 that details the location ID codes assigned to each ZIP code. In this embodiment, the data configuration module 500 is configured to refer to this data in assigning location ID codes to each ZIP code. For example, referring to the exemplary historical shipment data shown in FIG. 8, the data configuration module 500 may convert all "93551" ZIP codes to location ID code "9355," which may correspond to a particular shipping hub near Palmdale, Calif., as specified in the location ID code data. The data configuration module 500 repeats this process to replace all of the ZIP codes in the historical shipment data with their corresponding location ID codes and stores the data as a modified version of the historical shipment data.

Next, in step 508, the data configuration module 500 further modifies the historical shipment data by converting the destination location ID codes into location ID codes that correspond to the "next hub" to which the packages outbound from the simulation origin hub will be routed based on the package routing data. For example, referring to FIG. 9, all shipments destined for a shipping hub having a location ID code between 3200 and 3229, or between 3260 and 3499, will be routed to shipping hub 3229 and sorted during its twilight sort (i.e., the "Jacksonville" hub shown in FIG. 13). Accordingly, the data configuration module 500 would convert all destination location ID codes between 3200 and 3229, and between 3260 and 3499, to "3229." The data configuration module 500 may repeat this process to replace all of the destination location ID codes in the historical shipment data with their corresponding "next hub" location ID codes and store the data as a newly modified version of the historical shipment data.

Next, in step 510, the data configuration module 500 calculates the total number of packages shipped to each "next hub" listed in the load planning data based on the historical shipment data as modified in step 508. According to various embodiments, the data configuration module 500 identifies shipments in the modified historical shipment data having matching "next hub" location ID codes, sums the number of packages for all matching shipments, and records the result in the load planning data. For example, if the modified historical shipment data indicates that 10 shipments, having 41 packages each, are to be routed next to the New Stanton hub (i.e., location ID code 1569), the data configuration module 500 calculates that a total of 410 packages are to be routed to New Stanton during the defined time period. Accordingly, the data configuration module 500 inserts "410" into the "total number of inbound packages" column of the load planning data. In certain embodiments, the data configuration module 500 is also configured to calculate the total weight of packages inbound to a given hub using the same or similar method.

Next, in step 512, the data configuration module 500 calculates the simulated daily volume of packages inbound to each hub listed in the load planning data. According to certain embodiments, the data configuration module 500 retrieves the period of time represented in the historical shipment data from the simulation specification data stored in the databases 31, 32. The data configuration module 500 then inserts this value into the "Number of Days in Period" column. Next, the data configuration module 500 calculates the daily volume of packages inbound to each hub listed in the load planning data by dividing the "Total Number of Inbound Packages" value for each hub by the "Number of Days in Period" value. The data configuration module 500 then inserts the result into the "Daily Package Volume" column of the load planning data. Finally, in step 514, the data configuration module 500 stores the completed load planning data table. The exemplary load planning data shown in FIG. 13 illustrates the format of the completed load planning data.

In addition, in one embodiment, the data configuration module 500 is further configured to automatically determine whether a certain volume of packages represented in the load planning data is sufficient to fill a shipping vehicle. This is accomplished, according to certain embodiments, by using numerical factors representing the average size or weight of packages shipped by the shipper. First, in one embodiment, the data configuration module 500 multiplies the number of packages in a given shipment by a factor representing the average size of the shipper's packages. For example, the load planning data may show that 40 packages for a certain shipper are routed from hub A to hub B. The shipper's packages may have an average size of two cubic feet. Accordingly, the data configuration module 500 determines that the 100 packages will likely fill 80 cubic feet of space in a shipping vehicle. By comparing this measure to the capacity of a shipping vehicle, the data configuration module 500 determines whether the 40 packages would substantially fill the shipping vehicle. Second, the data configuration module 500 compares the maximum weight capacity of the shipping vehicle against the total weight of the packages shown in the load planning data. Thus, if the packages substantially fill the shipping vehicle and do not weight more than the shipping vehicle is capable of carrying, the data configuration module 500 determines that a direct shipment is appropriate.

As will be appreciated by those of skill in the art, the load planning data generated by the data configuration module 500 may be formatted in a number of ways that differ form the exemplary load planning data shown in FIG. 13. Moreover, the load planning system 5 may be configured to operate based these varying load planning data formats. In certain embodiments, the steps executed by the data configuration module 500 may be executed in an order which differs from that shown in FIG. 12 and may include additional or fewer steps.

Display Module

According to various embodiments, the display module 600 is configured to provide a user with visibility to the load planning data generated by the data configuration module 500 according to various viewing options. In various embodiments, the display module 600 is configured to receive user input from a user interface having virtual buttons representing various viewing options. For example, the virtual buttons may provide a user with the option to view all load planning data or, for more detailed analysis, to view only the load planning data associated with certain shipping hubs as defined by a range of location ID codes, range of ZIP codes, or a particular state. In response to a user selecting a viewing option (e.g., with a computer mouse or by hand via a touch-screen monitor), the display module 600, if necessary, prompts the user to provide input regarding the viewing option (e.g., state, ZIP code range, location ID code range, etc.). After receiving the user input, the display module 600 displays the load planning data to the user (e.g., on a computer screen) according to the user's selected viewing option and input.

FIG. 14 illustrates exemplary steps executed by the display module 600 in providing visibility to a user according to one embodiment. Beginning at step 601, the display module 600 imports the load planning data generated by the data configuration module 500. Next, at step 602, the display module 600 receives user input indicating a selected option for viewing the load planning data. In one embodiment, the display module 600 receives an indication that a user has selected a particular virtual button representing a particular viewing option provided on the user interface.

At step 603, the display module 600 determines whether the user has requested to view all load planning data. If the user has selected this viewing option, the display module 600 moves to step 604. At step 604, the display module 600 displays all of the load planning data generated by the data configuration module 500. If the user has not selected this viewing option, the display module 600 moves to step 605.

At step 605, the display module 600 determines whether the user has requested to view the load planning data by state (i.e., view all load planning data for hubs in a specified state). If the user has selected this viewing option, the display module 600 moves to step 606. At step 606, the display module 600 displays via a user interface a request for the user to specify a particular state, receives input from the user, and stores the particular state specified by the user input. In one embodiment, the user manually enters a state (e.g., by using a keyboard). In another embodiment, the user selects a state from a list provided via the user interface. Next, at step 607, the display module 600 identifies the load planning data for shipping hubs located within the state specified by the user and displays this data. In one embodiment, this is accomplished by identifying location IDs associated with the particular state selected by the user. For example, using the exemplary load planning data shown in FIG. 13, if a user requests to view all load planning data for hubs in Louisiana, the display module 600 would only display the load planning data for the New Orleans hub (i.e., combined location ID "7019N") and the Lake Charles hub (i.e., combined location ID "7069N"). According to various other embodiments, the display module 600 is configured to receive a request for and display load planning data for more than one state. If the user has not requested to view the load planning data by state, the display module 600 moves to step 608.

At step 608, the display module 600 determines whether the user has requested to view the load planning data for a range of location ID codes. If the user has selected this viewing option, the display module 600 moves to step 609. At step 609, the display module 600 displays via a user interface a request for the user to specify a range of location ID codes, receives input from the user, and stores the range of location ID codes specified by the user input. In one embodiment, the user manually enters a range of location ID codes. In another embodiment, the user selects beginning and ending location ID codes from a list provided via the user interface. Next, at step 610, the display module 600 identifies the load planning data for shipping hubs having location ID codes within the range specified by the user and displays the data. For example, using the exemplary load planning data shown in FIG. 13, if a user requests to view all load planning data for hubs having a location ID code between 2000 and 3000, the display module 600 displays the load planning data for the Burtonsville hub (i.e., combined location ID "2079T") and the Greensboro hub (i.e., combined location ID "2749D"). According to various embodiments, the display module 600 is configured to receive a request for and display load planning data for more than one range of location ID codes. If the user has not requested to view the load planning data by range of location ID codes, the display module 600 moves to step 612.

At step 612, the display module 600 determines whether the user has requested to view the load planning data for a range of ZIP codes. If the user has selected this viewing option, the display module 600 moves to step 613. At step 613, the display module 600 displays via a user interface a request for the user to specify a range of ZIP codes, receives input from the user, and stores the range of ZIP codes specified by the user input. In one embodiment, the user manually enters a range of ZIP codes. In another embodiment, the user selects beginning and ending ZIP codes from a list provided via the user interface. In certain embodiments, the display module 600 is configured to recognize a range of ZIP codes based on user input consisting of only the first three digits of two ZIP codes defining a range.

Next, at step 614, the display module 600 identifies the load planning data for shipping hubs located within the range of ZIP codes specified by the user and displays the data. For example, using the exemplary load planning data shown in FIG. 13, if a user requests to view all load planning data for hubs having a ZIP code between 30000 and 40000, the display module 600 displays the load planning data for the Atlanta hub (i.e., combined location ID "3039D"), the Jacksonville hub (i.e., combine location ID "3229T"), the Montgomery hub (i.e., combined location ID "3609N"), the Whites Creek hub (i.e., combined location ID "3719N"), and the Jackson Hub (i.e., combined location ID "3929N"). According to various embodiments, the display module 600 is configured to receive a request for and display load planning data for more than one range of ZIP codes. If the user has not requested to view the load planning data by range of ZIP codes, the display module 600 moves to step 616.

At step 616, the display module 600 determines whether the user has requested to view the total package volume by state (i.e., view the total number of packages inbound to all hubs in each state). If the user has selected this viewing option, the display module 600 moves to step 618. At step 618, the display module 600 calculates the total volume of packages inbound to each state represented in the load planning data. For example, using the exemplary load planning data shown in FIG. 13, the display module 600 would calculate the total number of packages inbound to Pennsylvania (i.e., New Stanton, Willow Grove), Massachusetts (i.e., Chelmsford), Maryland (i.e., Burtonsville), North Carolina (i.e., Greensboro), Georgia (i.e., Atlanta), and so forth. The total volume of packages inbound to Pennsylvania, for example, would be 1015 (i.e., 410+605). In addition, the display module 600 is configured to calculate the daily volume inbound to each state. Next, at step 619, the display module 600 displays a report detailing the total package volume inbound to each state.

According to various other embodiments, the display module 600 is configured to display load planning data in accordance with viewing options not shown in the exemplary steps of FIG. 14. For example, in embodiments in which the load planning system 5 is configured to simulate international shipments or shipments within a foreign country (e.g., shipments not within the United States or shipments between the U.S. and a foreign country), the display module 600 is configured to display load planning data according to countries, provinces, and/or foreign postal codes. In addition, in various embodiments, the display module 600 is configured to receive user input from a user interface that differs from the virtual button system described above. For example, in one embodiment, the display module 600 is configured to receive user input from a drop-down list of viewing options, input via a keyboard, or input via voice recognition software.

Alternative Routine Module

According to various embodiments, the alternative routing module 700 is configured to modify package routing data according to user input and store the modified package routing data for use in simulating shipments according to alternate shipping routes. As described above in relation to FIG. 11, the package routing module 400 is configured to import and store package routing data to simulate shipments. The alternative routing module 700 allows a user to modify the package routing data used in the initial (or "baseline") simulation to simulate shipments according to a different routing plan. By simulating shipments based on the same historical shipment data, but with modified package routing data, the user can view the effects of various routing changes. Repeating this process allows optimal routing plans to be identified without making permanent changes to the shipping entity's package routing data.

FIG. 15 illustrates exemplary steps executed by the alternative routing module 700 according to one embodiment. Beginning with step 702, the alternative routing module 700 retrieves the original package routing data imported by the package routing module 400 for use in the initial simulation and stores a copy of the original data as a new file. Next, in step 704, the alternative routing module 700 receives user input specifying modifications to the package routing data. In one embodiment, the alternative routing module 700 displays the package routing data, enabling the user to manually delete and enter data to modify the path of shipments. For example, if the alternative routing module 700 displays the package routing data of FIG. 9, the user may delete from the third row of data "0799" in the "Next Hub" column and enter in its place "0189." In another embodiment, the alternative routing module 700 displays a custom user interface designed to allow a user to modify the package routing data.

Next, in step 706, the alternative routing module 700 modifies the package routing data in accordance with the user input received in step 704. For example, referring to the exemplary modification above, when the load planning system 5 simulates shipments based on the modified data, it routes all packages destined for shipping hubs having location ID codes between 0700 and 0899 to shipping hub "0189" instead of "0799." This change increases the volume of packages bound for shipping hub "0189" and potentially allows the shipper to build a direct shipment to or from that hub.

Next, in step 708, the alternative routing module 700 stores the modified package routing data for use by the data configuration module 500. According to various embodiments, the alternative routing module 700 is configured to store the modified package routing data, separate from the original package routing data, in the memory 66 of the shipping entity server 20, in the package routing database 32, or in another medium accessible to the shipping entity server 20. In certain embodiments, the alternative routing module 700 is also configured to associate the simulation specification data created by the historical shipment and package routing modules 300, 400 with the modified package routing data.

Exemplary System Flow

In order to simulate the flow of packages, the processor 60 and operating system 80 of the load planning system 5 are configured to call the various modules 300, 400, 500, 600, 700 in response to user input received from a user interface according to various embodiments. FIG. 16 illustrates exemplary steps executed by the load planning system 5, according to one embodiment, in response to user input received from an exemplary user interface illustrated in FIG. 17. The exemplary user interface of FIG. 17 is, for example, displayed on a monitor connected to the shipping entity computer 10 according to a particular embodiment. Each virtual button (e.g., "import source data") shown on the user interface represents a selectable object that triggers the load planning system 5 to call a particular module. A virtual button may be selected, for example, by pointing to and clicking on the button with a mouse connected to the shipping entity computer 10.

In various embodiments, the process shown in FIG. 16 is initiated when a user accesses the load planning system 5. In one embodiment, a user accesses the load planning system 5 by logging into the system via the shipping entity computer 10. In another embodiment, a user accesses the load planning system 5 remotely from a computer connected to the load planning system 5 over a network (e.g., the Internet). As will be appreciated by one of skill in the art, the load planning system 5 may be adapted to facilitate other methods and options of providing user access to the load planning system 5 according to various embodiments.

Beginning at step 904, the load planning system 5 displays a main user interface on a monitor connected to the shipping entity computer 10. In one embodiment, shown in FIG. 17, the user interface includes a set of "Baseline" virtual buttons and "Scenario 1" virtual buttons. The "Baseline" virtual buttons are configured for creating an initial simulation of package shipments. After the initial simulation is created, the "Scenario 1" buttons are activated, allowing the user to create additional simulations based on different data for comparison.

Referring to the exemplary "Baseline" virtual buttons in FIG. 17, the "Import Source Data" button allows the user to select historical shipment data for use in the initial simulation. The "Import 310 Flow Data" button allows the user to select package routing data for use in the initial simulation. The "Configure Source Data" button instructs the load planning system 5 to create load planning data based on the specified historical shipment data and package routing data. The "View Results" button instructs the load planning system 5 to display all load planning data. The "View by State" button instructs the load planning system 5 to display only load planning data for a user-specified state or states. The "View by SLIC Range" button instructs the load planning system 5 to display only load planning data for a user-specified range of location ID codes. The "View by Range Dest Zip" instructs the load planning system 5 to display only load planning data for a user-specified range of ZIP codes. The "Total Volume by State" button instructs the load planning system 5 to calculate and display the total volume of packages inbound to each state.

Referring to the exemplary "Scenario 1" virtual buttons in FIG. 17, the "Import Source Data" button instructs the load planning system 5 to import the same historical shipment data used in the initial simulation. The "Import 310 Flow Data" button allows the user to modify the package routing data used in the initial "Baseline" simulation. The "Configure Source Data" button instructs the load planning system 5 to create a "Scenario 1" set of load planning data based on the original historical shipment data and modified package routing data. The "View Results" button instructs the load planning system 5 to display the "Scenario 1" set of load planning data generated from the modified package routing data. The "View Zip Range by Dest Hub" button instructs the load planning system 5 to display only load planning data for a user-specified range of ZIP codes. The "View SLIC Range by Hub" button instructs the load planning system 5 to display only load planning data for a user-specified range of location ID codes. The "View State Range by Dest Hub" button instructs the load planning system 5 to display only load planning data for a user-specified state or states. In other embodiments, the load planning system 5 may be configured to provide a user with the additional options of modifying the historical shipment data or selecting a different set of historical shipment data.

In other embodiments, the general arrangement and labeling of the user interface may be altered. For example, the options may be presented in the form of a drop-down menu or through another visual representation capable of indicating a user selection to the load planning system 5. In addition, the display module 600 may be configured to display fewer viewing options or additional viewing options. As is discussed below in steps 906 through 932, the load planning system 5 is configured to recognize a user's selection of an option presented on the interface and call the appropriate program module. Accordingly, when a user selects an option from the user interface, the load planning system 5 moves to step 906.

At step 906, the load planning system 5 determines whether the user has selected "Import Source Data" from the "Baseline" set of options. If the user has selected "Import Source Data," the load planning system 5 moves to step 908. At step 908, the load planning system 5 calls the historical shipment module 300. As described above, the historical shipment module 300 is configured to import, format, and store historical shipment data specified by the user for use in a load planning simulation. In certain embodiments, the historical shipment module 300 provides a user interface that allows the user to select package routing data to use in the simulation. After the historical shipment module 300 imports, formats, and stores the selected historical shipment data, the load planning system 5 moves back to step 904 and awaits the next user selection. If the user has not selected "Import Source Data," the load planning system 5 moves to step 910.

At step 910, the load planning system 5 determines whether the user has selected "Import 310 Flow Data" from the "Baseline" set of options. If the user has selected "Import 310 Flow Data," the load planning system 5 moves to step 912. At step 912, the load planning system 5 calls the package routing module 400. As described above, the package routing module 400 is configured to import and store package routing data for use in the load planning simulation. In certain embodiments, the package routing module 400 provides a user interface that allows the user to select package routing data to use in the simulation. FIG. 18 illustrates an exemplary user interface provided by the package routing module 400 that allows a user to specify package routing data according to country ("Ctry"), origin shipping hub ("Orig"), sort time ("Srt"), service level ("Service"), and calendar month ("Month"). In the illustrated embodiment, the package routing module 400 is configured to automatically retrieve package routing data for the parameters entered by the user. After the package routing module 400 imports and stores the selected package routing data, the load planning system 5 moves back to step 904 and awaits the next user selection. If the user has not selected "Import 310 Flow Data," the load planning system 5 moves to step 914.

At step 914, the load planning system 5 determines whether the user has selected "Configure Source Data" from the "Baseline" set of options. If the user has selected "Configure Source Data," the load planning system 5 moves to step 916. At step 916, the load planning system 5 calls the data configuration module 500. As described above, the data configuration module 500 is configured to generate load planning data based on the selected historical shipment data and package routing data. After the data configuration module 500 creates and stores the load planning data, the load planning system 5 moves to step 918.

At step 918, the load planning system 5 calls the display module 600. As described above, the display module 600 is configured to provide a user with visibility to the load planning data generated by the data configuration module 500 according to various viewing options. Referring back to the exemplary steps shown in FIG. 14, the display module 600 recognizes a user's selection of one of the viewing options provided on the exemplary user interface shown in FIG. 17. The display module 600 then displays the load planning data based on the user's selection and preferences. For example, FIG. 19 illustrates an exemplary display provided in response to a user selecting "View Results" (i.e., view all load planning data). After the display module 600 displays the load planning data, the load planning system 5 moves back to step 904 and awaits the next user selection. If the user has not selected "Configure Source Data," the load planning system 5 moves to step 920.

At step 920, the load planning system 5 determines whether the user has selected "Import Source Data" from the "Scenario 1" set of options. If the user has selected "Import Source Data," the load planning system 5 moves to step 922. At step 922, the load planning system 5 calls the historical shipment module 300. In one embodiment, the historical shipment module 300 is configured to automatically import the formatted historical shipment data specified for use in the "Baseline" simulation when called in response to a "Scenario 1" request. In another embodiment, the historical shipment module 300 is configured to provide the user with the options of using the "Baseline" historical shipment data, modifying a copy of the "Baseline" historical shipment data, or selecting a different set of historical shipment data. After the historical shipment module 300 imports, formats, and stores the specified historical shipment data, the load planning system 5 moves back to step 904 and awaits the next user selection. If the user has not selected "Import Source Data," the load planning system 5 moves to step 924.

At step 924, the load planning system 5 determines whether the user has selected "Import 310 Flow Data" from the "Scenario 1" set of options. If the user has selected "Import 310 Flow Data," the load planning system 5 moves to step 926. At step 926, the load planning system 5 calls the alternative routing module 700. As described above, the alternative routing module 700 is configured to modify package routing data according to user input and store the modified package routing data for use in simulating shipments according to alternate shipping routes. In certain embodiments, the alternative routing module 700 provides a user interface that allows the user to modify routing data used in the simulation. In one embodiment, the alternative routing module 700 provides a user interface identical to exemplary user interface provided by the package routing module 400 shown in FIG. 18. In this embodiment, the alternative routing module 700 permits a user to delete the current routing data and enter alternative data. For example, as discussed above, the user may delete from the third row of data "0799" in the "Next Hub" column and enter in its place "0189." After the alternative routing module 700 modifies the package routing data and stores it as alternative package routing data, the load planning system 5 moves back to step 904 and awaits the next user selection. If the user has not selected "Import 310 Flow Data," the load planning system 5 moves to step 928.

At step 928, the load planning system 5 determines whether the user has selected "Configure Source Data" from the "Scenario 1" set of options. If the user has not selected "Configure Source Data," the load planning system 5 moves to step 904. If the user has selected "Configure Source Data," the load planning system 5 moves to step 930. At step 930, the load planning system 5 calls the data configuration module 500. As described above, the data configuration module 500 is configured to generate load planning data based on the selected historical shipment data and package routing data. Thus, if the user specifies the same historical shipment data used in the "Baseline" simulation, but modifies the package routing data, the data configuration module 500 will generate "Scenario 1" load planning data reflecting the same volume of packages routed differently. After the data configuration module 500 creates and stores the "Scenario 1" load planning data, the load planning system 5 moves to step 932.

At step 932, the load planning system 5 calls the display module 600. As described above, the display module 600 is configured to provide a user with visibility to the load planning data generated by the data configuration module 500 according to various viewing options. Referring back to the exemplary steps shown in FIG. 14, the display module 600 recognizes a user's selection of one of the viewing options provided on the user interface shown in FIG. 17. The display module 600 then displays the load planning data based on the user's selection and preferences. After the display module 600 displays the load planning data, the load planning system 5 moves back to step 904 and awaits the next user selection.

According to various other embodiments, the server 20 of the load planning system 5 is configured to call the various modules 300, 400, 500, 600, 700 in a predetermined order, rather than in response to user input. In addition, the load planning system 5 is configured to display an "error" message when a user selects an option out of proper order. For example, if a user selects "Configure Source Data" before importing historical shipment and package routing data, an "error" message may be displayed on the user interface indicating the user's error. If, however, a user selects "Import 310

Flow Data" before importing historical shipment data, no error message would be required as the system is not dependent on whether the package routing or historical shipment data is imported first. The load planning system 5 may also be configured to provide the user with the option of creating an infinite number of alternative "Scenarios," rather than one "Scenario 1" as is shown in the illustrated embodiments. These additional scenarios may be provided and utilized in the same way the "Scenario 1" options are described above.

Exemplary Use of Load Planning System

The exemplary load planning system steps described above and shown in FIG. 16 may be executed by the load planning system 5 in response to user input in simulating the shipments shown in FIGS. 1A, 1B, 2A, 2B, 3A, and 3B. For example, a user may use the load planning system 5 to simulate the exemplary shipping routes shown in FIGS. 1A and 1B. In accordance with the exemplary steps of FIG. 16, the user first accesses the load planning system 5, selects "Import Source Data" from the "Baseline" options, and specifies historical shipment data for the shipper's past shipments from Richmond during a certain period of time. Next, the user selects "Import 310 Flow Data" from the "Baseline" options and specifies package routing data for the Phoenix hub—the last hub the packages are routed through before reaching the final hub in Sacramento. By specifying Phoenix as the simulation origin hub and using the Richmond historical shipment data, the user will be able to view the package volume inbound to Sacramento. As the data configuration module 500 does not consider the origin hub of the historical shipment data when generating load planning data, the load planning system 5 allows the user to view the package volume as if it were routed from the simulation origin hub. If Richmond was specified as the simulation origin hub, for example, the resulting load planning data would show the Sacramento bound packages as destined for Greensboro (i.e., the next hub for packages shipped from Richmond). As there may be other packages routed to Greensboro from Richmond that are not bound for Sacramento, the Phoenix hub is the most effective simulation origin hub.

Next, the user selects "Configure Source Data" and "View Results" from the "Baseline" options. If the results show a volume of packages routed from Phoenix to Sacramento sufficient to fill an entire shipping vehicle, it may be possible to build a direct shipment from Richmond to Sacramento. This may be determined in two ways. First, the load planning data displayed to the user will show the daily amount of packages shipped to each hub. If this daily amount is sufficient to fill a shipping vehicle based on the average size or weight of the shipper's packages, a direct load can be built to Sacramento each day. Second, if the daily amount is insufficient to fill a shipping vehicle, the shipper may be willing to wait a certain number of days to build enough volume to fill a shipping vehicle. If, for example, the shipper is willing to ship every four days, the daily shipping volume need only be a one-quarter of the amount required to fill a shipping vehicle.

To verify a direct shipment, the user may run an additional simulation based on package routing data modified to route packages bound for Sacramento directly to Sacramento instead of Greensboro. To run the alternative simulation, the user first selects "Import Source Data" from the "Scenario 1" options and elects to use the same historical shipment data used in the initial simulation. Next, the user selects "Import 310 Flow Data" from the "Scenario 1" options, selects Richmond as the simulation origin hub, and elects to modify the package routing data. In the Richmond package routing data, the user will see that packages shipped from Richmond that are bound for Sacramento are routed next to the Greensboro hub. To route these packages directly to Sacramento, the user may delete the Greensboro location ID code from the "Next Hub" column and insert the Sacramento location ID code. Next, the user may select "Configure Source Data" and "View Results" from the "Scenario 1" options. The displayed load planning data will reflect that the same number of packages routed from Phoenix to Sacramento in the "Baseline" simulation are routed directly from Richmond to Sacramento in the "Scenario 1" simulation. If the total package volume shown inbound to Sacramento is sufficient to fill a shipping vehicle, the direct shipment route shown in FIG. 1B will be the most efficient route.

However, if there are not enough packages being shipped from Richmond to Sacramento to fill an entire shipping vehicle—either due to lack of overall volume or the inability of the customer to hold packages for a certain number of days—the user may instruct the load planning system 5 to combine shipments from multiple locations. As described above, FIGS. 2A and 2B show the combination of shipments from Richmond and Jacksonville to build a direct shipment to Sacramento. To simulate these shipments, the user first creates the "Baseline" simulation described above. This initial simulation would indicate that not enough packages are being shipped from Richmond (alone) to Sacramento to build a direct shipment. Using the same methodology, the user next runs a new "Baseline" simulation based on historical shipment data from the Jacksonville hub during the same period of time. Based on these two "Baseline" simulations, the user may recognize that combining the volume of packages shipped from Richmond to Sacramento and Jacksonville to Sacramento, both of which are routed through Phoenix, may result in enough volume to fill a shipping vehicle.

To verify this, the user may run a "Scenario 1" simulation, using a methodology similar to that described above, based on combined historical shipment data for Jacksonville and Richmond shipments. First, the user may instruct the load planning system 5 to combine the historical shipment data for Richmond and Jacksonville and specify this combined historical shipment data (i.e., "import source data"). Identifying the Greensboro hub as an intermediate hub between Jacksonville and Richmond, the user may select Greensboro as the simulation origin hub for the "Scenario 1" simulation. In addition, the user may instruct the load planning system 5 to modify the Greensboro package routing data such that packages bound for Sacramento and routed directly to Sacramento rather than Memphis. The load planning data generated and displayed from this alternative simulation will indicate a volume of packages shipped from Greensboro to Sacramento equivalent to the total number of package shipped form Richmond and Jacksonville to Sacramento in the initial simulations. If this total is sufficient to fill a shipping vehicle, the alternative route shown in FIG. 2B is most appropriate.

Finally, a user may also instruct the load planning system 5 to combine shipments from a single origin location to multiple destinations as shown in FIGS. 3A and 3B. As described above, FIG. 3B shows the combination of shipments from Greensboro to Portland, San Francisco, and Los Angeles to build a direct shipment to Sacramento. To simulate these shipments, the user first creates two separate "Baseline" simulations using Denver and Phoenix as the simulation origin hubs, respectively. Using the methodology outlined above, the Denver "Baseline" simulation will show the number of packages being routed from Greensboro to Portland, while the Phoenix "Baseline" simulation will show the number of packages being routed from Greensboro to Sacramento and Los Angeles. Each "Baseline" simulation may indicate that there are not enough packages are being shipped from Greensboro to build a direct shipment to each destination location. However, the results may also indicate that combining the packages sent to all three destination locations would fill a shipping vehicle. If so, the shipments may be combined and shipped directly to a location on the west coast before being routed to their final destinations.

To verify this, the user may run a "Scenario 1" simulation, using a similar methodology to that described above, based on the same Greensboro historical shipment data and modified Greensboro package routing data. Recognizing that Sacramento is a relatively central west-coast location in relation to the final destinations, the user may select Greensboro as the simulation origin hub and instruct the load planning system 5 to modify the Greensboro package routing data such that packages bound for Portland, San Francisco, and Los Angeles are all routed next to Sacramento. The data generated and displayed from the "Scenario 1" simulation will reflect that the number of packages shipped from Greensboro to Sacramento is equivalent to the total number of packages shipped form Greensboro to Portland, San Francisco, and Los Angeles. If this total is sufficient to fill a shipping vehicle, the alternative route shown in FIG. 3B is most appropriate.

In the above described embodiment, the load planning system 5 is configured to provide the user with information regarding the shipment of packages that allows the user to make informed decisions regarding the routing of the various packages. Examples of these routing decisions are described immediately above in relation to FIGS. 1, 2, and 3. However, in another embodiment, the load planning system 5 is configured to automatically make intelligent routing decisions based on the system's own programmed logic. These routing decisions may be based on contingencies defined by the user. For example, as described above, a user may specify the average package size for a given shipper, the maximum volumetric capacity of a given shipping vehicle, and the maximum weight the same shipping vehicle is capable of transporting. Based on these factors, the load planning system 5 may be configured to identify shipments calculated in the "Baseline" simulation as having a volume of packages sufficient to substantially fill a shipping vehicle and automatically create direct shipments that by-pass intermediate shipping hubs for those packages (e.g., the shipment shown in FIG. 1B). In addition, based on the preferences of the shipper (e.g., whether holding packages is possible), the load planning system 5 may be configured to identify shipments which may be held for a certain number of days in order to build a direct shipment. The load planning system 5 may also be configured to automatically identify multiple shipments that may be combined to form direct shipments (e.g., the shipments shown in FIGS. 2 and 3).

In each of these embodiments, the load planning system 5 may be further configured to automatically change non-simulation package routing data used to route packages for a shipper in order to ship the packages according to the optimal routing options determined by the system 5. Additionally, in other embodiments, optimal routing options determined by a user using the load planning system 5 may also be used to modify the non-simulation routing data used to route packages.

CONCLUSION

Many modifications and other embodiments of the invention will come to mind to one skilled in the art to which this invention pertains having the benefit of the teachings presented in the foregoing descriptions and the associated drawings. Accordingly, it is to be understood that the invention is not to be limited to the specific embodiments disclosed and that modifications and other embodiments are intended to be included within the scope of the invention. Although specific terms are employed herein, they are used in a generic and descriptive sense only and not for the purposes of limitation.

The invention claimed is:

1. A load planning system comprising one or more memory storage areas and at least one computer processor configured for executing the steps of:
   (A) receiving user input requesting retrieval of historical shipment data and indicating a certain shipper, a certain origin location, and a certain time period;
   (B) retrieving historical shipment data relating to one or more packages previously shipped from said certain origin location for said certain shipper by one or more shipping entities during said certain time period, said historical shipment data comprising an indication of one or more package attributes associated with each of said one or more packages, wherein said one or more package attributes include a destination location;
   (C) receiving user input requesting a first simulation and indicating a simulation origin location associated with a shipping hub operated by a certain shipping entity;
   (D) retrieving package routing data for said certain shipping entity, said package routing data comprising data indicating a next shipping hub to which a shipped package would be routed if shipped from said simulation origin location based, at least in part, on the shipped package's destination location;
   (E) generating said first simulation, wherein said first simulation simulates the shipment of said one or more packages according to said package routing data, and wherein generating said first simulation comprises identifying the next shipping hub to which each of said one or more packages would be inbound if shipped from said simulation origin location according to said package routing data, and identifying a daily number of said packages that would be inbound to each next shipping hub if shipped from said simulation origin location according to said package routing data;
   (F) receiving user input requesting a second simulation and indicating one or more modifications to said package routing data;
   (G) generating modified package routing data based on said modifications; and
   (H) generating a second simulation simulating the shipment of said one or more packages according to said modified package routing data, wherein generating said second simulation comprises identifying the next shipping hub to which each of said one or more packages would be inbound if shipped from said simulation origin location according to said modified package routing data, and identifying a daily number of said packages that would be inbound to each next shipping hub if shipped from said simulation origin location according to said modified package routing data.

2. The load planning system of claim 1, wherein said one or more attributes indicated by said historical shipment data further include an indication of the volume of each of said one or more packages shipped.

3. The load planning system of claim 2, wherein:
   generating said first simulation further comprises determining an estimated total volume of said packages inbound to each next shipping hub according to said package routing data; and
   generating said second simulation further comprises determining an estimated total volume of said packages inbound to each next shipping hub according to said modified package routing data.

4. The load planning system of claim 2, wherein said at least one computer processor is further configured for:
estimating a first total volume of said packages that would be inbound to a particular one of said next shipping hubs according to said package routing data;
estimating a first total weight of said packages that would be inbound to said particular next shipping hub according to said package routing data;
determining whether said first total volume will substantially fill said shipping vehicle; and
determining whether said first total weight will exceed the weight capacity of said shipping vehicle.

5. The load planning system of claim 2, wherein said at least one computer processor is further configured for:
estimating a first total volume of said packages that would be inbound to a particular one of said next shipping hubs according to said modified package routing data;
estimating a first total weight of said packages that would be inbound to said particular next shipping hub according to said modified package routing data;
determining whether said first total volume will substantially fill said shipping vehicle; and
determining whether said first total weight will exceed the weight capacity of said shipping vehicle.

6. The load planning system of claim 1, wherein generating said first simulation further comprises identifying a first subset of said one or more packages destined to a particular next shipping hub if shipped from said simulation origin location according to said package routing data and a number of said one or more packages identified in the first subset.

7. The load planning system of claim 6, wherein generating said first simulation further comprises identifying a second subset of said one or more packages destined to a second particular next shipping hub if shipped from said simulation origin location according to said package routing data and a second number of said one or more packages identified in the second subset.

8. The load planning system of claim 1, wherein said at least one computer processor is further configured for receiving user input indicating a shipping service level offered by said certain shipping entity, wherein said package routing data indicates said next shipping hub based, at least further in part, on the service level at which said shipped package is shipped.

9. The load planning system of claim 8, wherein, for a particular destination location, said package routing data comprises a first next shipping hub associated with a first shipping service level and a second next shipping hub associated with a second shipping service level.

10. The load planning system of claim 1, wherein said at least one computer processor is further configured for receiving user input indicating a sort time, wherein said package routing data indicates said next shipping hub based, at least further in part, on said shipped package's sort time.

11. The load planning system of claim 10, wherein, for a particular destination location, said package routing data comprises a first next shipping hub associated with a first sort time and a second next shipping hub associated with a second sort time.

12. The load planning system of claim 1, wherein generating said first simulation further comprises identifying a number of said packages that would be inbound to each next shipping hub if shipped from said simulation origin location according to said package routing data, and said at least one computer processor is further configured for causing the number of said packages inbound to each next shipping hub if shipped according to said package routing data to be displayed to a user via a user interface.

13. The load planning system of claim 12, wherein generating said second simulation further comprises identifying a number of said packages that would be inbound to each next shipping hub if shipped from said simulation origin location according to said modified package routing data, and said at least one computer processor is further configured for causing the number of said packages inbound to each next shipping hub if shipped according to said modified package routing data to be displayed to said user via said user interface.

14. The load planning system of claim 1, wherein:
said one or more attributes indicated by said historical shipment data further include an indication of the weight of each of said one or more packages shipped.

15. The load planning system of claim 14, wherein:
generating said first simulation further comprises identifying a total weight of said packages inbound to each next shipping hub according to said package routing data; and
generating said second simulation further comprises identifying a total weight of said packages inbound to each next shipping hub according to said modified package routing data.

16. The load planning system of claim 1, wherein generating said second simulation further comprises identifying a first subset of said one or more packages destined to a particular next shipping hub if shipped from said simulation origin location according to said modified package routing data and a number of said one or more packages identified in the first subset.

17. The load planning system of claim 1 wherein said certain time period comprises a certain month.

18. The load planning system of claim 1, wherein said at least one computer processor is further configured for causing the identification of said next shipping hub to which each of said one or more packages would be inbound as generated in each of said first simulation and said second simulation to be displayed to a user via a user interface.

19. The load planning system of claim 1, wherein said at least one computer processor is further configured for receiving, via a user interface, user input indicating a second origin location, wherein said historical shipment data further comprises an indication of a past destination location associated with each of one or more packages shipped from said second origin location for said shipper by said one or more shipping entities during said time period.

20. The load planning system of claim 1, wherein said at least one computer processor is further configured for:
receiving user input indicating a selection of two or more of said next shipping hubs;
causing a first number of packages inbound to said selected two or more next shipping hubs according to said package routing data to be displayed to a user via a user interface; and
causing a second number of packages inbound to said selected two or more next shipping hubs according to said modified package routing data to be displayed to said user via said user interface.

21. The load planning system of claim 1, wherein said package routing data comprises a first next shipping hub associated with a particular destination location, and said modified package routing data comprises a second next shipping hub associated with said particular destination location, wherein said first next shipping hub is different from said second next shipping hub.

22. The load planning system of claim 1, wherein each said destination location is associated with a range of ZIP codes, and said at least one computer processor is further configured for:
  receiving user input indicating a range of ZIP codes; and
  causing a number of a subset of said one or more packages inbound to each next shipping hub from said simulated origin location according to said package routing data to be displayed to a user via a user interface, wherein said subset of said one or more packages comprises one or more packages destined for one or more destination locations associated with said range of ZIP codes.

23. The load planning system of claim 1, wherein each said next shipping hub is associated with a range of ZIP codes, and said at least one computer processor is further configured for:
  receiving user input indicating a range of ZIP codes; and
  causing a number of a subset of said one or more packages inbound to each next shipping hub from said simulated origin location according to said package routing data to be displayed to a user via a user interface, wherein said subset of said one or more packages comprises one or more packages to be shipped to one or more of said next shipping hubs associated with said range of ZIP codes.

* * * * *